(12) United States Patent
Silverstein et al.

(10) Patent No.: US 12,047,553 B2
(45) Date of Patent: Jul. 23, 2024

(54) STEREO IMAGE PROJECTION WITH HIGH INTRA-FRAME CONTRAST

(71) Applicant: IMAX Corporation, Mississauga (CA)

(72) Inventors: Barry Silverstein, Rochester, NY (US); Andrew F. Kurtz, Macedon, NY (US); Gary E. Nothhard, Hilton, NY (US); Steven Charles Read, Mississauga (CA); Anton Leonard Baljet, Sequin (CA)

(73) Assignee: IMAX Corporation, Mississauga (CA)

( * ) Notice: Subject to any disclaimer, the term of this patent is extended or adjusted under 35 U.S.C. 154(b) by 9 days.

(21) Appl. No.: 17/667,290

(22) Filed: Feb. 8, 2022

(65) Prior Publication Data

US 2022/0159234 A1    May 19, 2022

Related U.S. Application Data

(62) Division of application No. 16/071,136, filed as application No. PCT/IB2017/050396 on Jan. 25, 2017, now abandoned.

(Continued)

(51) Int. Cl.
*H04N 13/363* (2018.01)
*H04N 13/337* (2018.01)

(52) U.S. Cl.
CPC ......... *H04N 13/363* (2018.05); *H04N 13/337* (2018.05)

(58) Field of Classification Search
None
See application file for complete search history.

(56) References Cited

U.S. PATENT DOCUMENTS

| 4,792,850 A | 12/1988 | Liptoh et al. |
| 4,957,361 A | 9/1990 | Shaw |

(Continued)

FOREIGN PATENT DOCUMENTS

| CN | 1467561 | 1/2004 |
| CN | 101344713 | 1/2009 |

(Continued)

OTHER PUBLICATIONS

U.S. Appl. No. 16/071,136, Non-Final Office Action mailed Aug. 10, 2021, 17 pages.

(Continued)

*Primary Examiner* — Clifford Hilaire
(74) *Attorney, Agent, or Firm* — Kilpatrick Townsend & Stockton LLP

(57) ABSTRACT

A projection system includes a projection lens to project image light along an image light path towards a port window and to redirect a portion of the image light away from the image light path as result of being scattered or reflected away from the image light path. The projection system includes a port window for transmitting projected image light from the projection lens. The port window has a surface for redirecting a portion of the projected image light as result of being scattered or reflected away from the image light path. The projection system includes an enclosure positioned between the port window and the projection lens to surround the image light path between the port window and the projection lens. The enclosure absorbs the portion of the image light redirected by the projection lens and absorbs the portion of the projected image light redirected by the surface.

18 Claims, 16 Drawing Sheets

Related U.S. Application Data

(60) Provisional application No. 62/287,184, filed on Jan. 26, 2016.

(56) References Cited

U.S. PATENT DOCUMENTS

| | | | |
|---|---|---|---|
| 5,564,811 A * | 10/1996 | Lim | H04N 5/7458 |
| | | | 348/E5.142 |
| 5,658,490 A | 8/1997 | Sharp et al. | |
| 5,820,673 A * | 10/1998 | Sentilles | B29D 11/00865 |
| | | | 118/643 |
| 5,870,159 A | 2/1999 | Sharp | |
| 6,771,323 B1 * | 8/2004 | Dean | H04N 7/088 |
| | | | 348/E17.001 |
| 7,528,906 B2 | 5/2009 | Robinson et al. | |
| 7,633,666 B2 | 12/2009 | Lipton et al. | |
| 7,857,455 B2 | 12/2010 | Cowan et al. | |
| 8,023,052 B1 | 9/2011 | Osterman et al. | |
| 8,177,366 B2 | 5/2012 | Lee et al. | |
| 8,220,934 B2 | 7/2012 | Schuck et al. | |
| 8,403,488 B2 | 3/2013 | Schuck et al. | |
| 8,649,094 B2 | 2/2014 | Kurtz et al. | |
| 8,727,536 B2 | 5/2014 | Schuck et al. | |
| 8,830,580 B2 | 9/2014 | Kurtz et al. | |
| 2001/0013977 A1 | 8/2001 | Tadic-Galeb et al. | |
| 2002/0051642 A1 * | 5/2002 | Hicks | H04N 1/0027 |
| | | | 396/429 |
| 2002/0131170 A1 | 9/2002 | Costales | |
| 2002/0167652 A1 | 11/2002 | Ueyama et al. | |
| 2003/0007105 A1 | 1/2003 | Magarill et al. | |
| 2003/0103194 A1 | 6/2003 | Gross et al. | |
| 2004/0071889 A1 * | 4/2004 | Asakawa | G02B 1/115 |
| | | | 427/402 |
| 2005/0174775 A1 | 8/2005 | Conner | |
| 2007/0035852 A1 | 2/2007 | Farr | |
| 2007/0195417 A1 * | 8/2007 | Yamamoto | H04N 9/3114 |
| | | | 359/590 |
| 2007/0263179 A1 | 11/2007 | Katsuragawa et al. | |
| 2009/0190095 A1 | 7/2009 | Ellinger et al. | |
| 2009/0190101 A1 | 7/2009 | Alasaarela et al. | |
| 2009/0278998 A1 | 11/2009 | El-Ghoroury et al. | |
| 2010/0328609 A1 | 12/2010 | Silverstein et al. | |
| 2011/0019152 A1 | 1/2011 | Shestak et al. | |
| 2011/0176114 A1 | 7/2011 | Schuck, III et al. | |
| 2012/0038892 A1 | 2/2012 | Kurtz et al. | |
| 2012/0229430 A1 | 9/2012 | Ward et al. | |
| 2013/0107218 A1 | 5/2013 | Ebbesmeier et al. | |
| 2013/0107360 A1 | 5/2013 | Kurtz et al. | |
| 2013/0235355 A1 * | 9/2013 | Hirata | G03B 21/28 |
| | | | 353/58 |
| 2014/0118825 A1 | 5/2014 | Shikii et al. | |
| 2014/0253879 A1 | 9/2014 | Schuck et al. | |
| 2015/0138508 A1 | 5/2015 | Sharp et al. | |
| 2016/0033757 A1 | 2/2016 | Kurtz et al. | |
| 2016/0150225 A1 * | 5/2016 | Kurashige | G02B 30/25 |
| | | | 353/8 |
| 2016/0373701 A1 | 12/2016 | Ferri et al. | |
| 2017/0064269 A1 | 3/2017 | Schuck et al. | |
| 2020/0162707 A1 | 5/2020 | Hu et al. | |
| 2021/0168352 A1 | 6/2021 | Silverstein et al. | |

FOREIGN PATENT DOCUMENTS

| | | |
|---|---|---|
| CN | 101625512 | 1/2010 |
| CN | 101803392 A | 8/2010 |
| CN | 101878655 A | 11/2010 |
| CN | 101925855 | 12/2010 |
| CN | 102737563 | 10/2012 |
| CN | 102971659 | 3/2013 |
| CN | 103246002 | 8/2013 |
| CN | 104220920 | 12/2014 |
| CN | 105182672 | 12/2015 |
| CN | 105210361 | 12/2015 |
| CN | 105339836 A | 2/2016 |
| JP | 2004302478 | 10/2004 |
| JP | 2009116050 | 5/2009 |
| JP | 2017015927 | 1/2017 |
| WO | 2017130121 | 8/2017 |

OTHER PUBLICATIONS

Chinese Patent Application No. 201780019982.0, Office Action mailed Sep. 7, 2020, 8 pages (English machine translation provided).

European Patent Application No. 17743810.8, Extended European Search Report mailed Jun. 3, 2019, 6 pages.

European Patent Application No. 17743810.8, Notice of Decision to Grant mailed Oct. 1, 2020, 2 pages.

Liu et al., "A Novel BLU-Free Full-Color LED Projector using LED on Silicon Micro-Displays", Institute of Electrical and Electronics Engineers Photonics Technology Letters, vol. 25, No. 23, 2013, 4 pages.

International Patent Application No. Application No. PCT/IB2017/050396, International Search Report and Written Opinion, Mailed on May 10, 2017, 10 pages.

International Patent Application No. PCT/IB2017/050396, Invitation to Pay Addt'l Fees and Partial Search Report mailed Mar. 24, 2017, 2 pages.

\* cited by examiner

STEREO IMAGE PROJECTION WITH HIGH INTRA-FRAME CONTRAST

CROSS-REFERENCE TO RELATED APPLICATIONS

This is a divisional of U.S. patent application Ser. No. 16/071,136, filed Jul. 19, 2018 and titled "Stereo Image Projection with High Intra-frame Contrast," which is a U.S. National Phase of PCT Application No. PCT/IB2017/050396, filed Jan. 25, 2017 and titled "Stereo Image Projection with High Intra-frame Contrast," which claims priority to U.S. Provisional Patent Application Ser. No. 62/287,184, filed Jan. 26, 2016 and titled "Stereo Image Projection with High Intra-frame Contrast," and the entirety of each of which is incorporated herein by reference.

TECHNICAL FIELD

The present disclosure relates generally to projecting polarization-based stereo images having improved image quality, in which polarization modulation can be used to switch between left-eye images and right-eye images and while intra-frame contrast is maintained or improved.

BACKGROUND

The image quality attributes of image projection, including for cinema, can be evaluated and specified in terms of resolution, contrast, uniformity, color rendering, white point, and other parameters. Stereo image projection, in which polarization, color, or spectral bandwidth is used to alternately encode left and right images that are perceived by audience members viewing through appropriate glasses can also be specified for image quality, relative to stereo cross-talk, uniformity, angular sensitivity, and other factors. Although the projected image quality has improved with the use of more sophisticated projection technologies, stereo encoding optics can still degrade the projected image quality during either two-dimensional (2D) or three-dimensional (3D) image projection.

Stereo image projection for cinema was first popularized by IMAX™ Corporation, using a configuration having two film-based projectors in a projection booth, and directing image light through linear polarization filters, prior to the image light arriving to a distant screen. These linear polarizers are crossed, such that one projector provides vertically polarized light and the other provides horizontally polarized light. And observers that are wearing stereo glasses with a crossed pair of linear polarization lenses can then view stereo image content.

U.S. Pat. No. 4,792,850 to Liptoh et al., titled "Method and System Employing a Push-Pull Liquid Crystal Modulator," provides polarization-based stereo image projection in which a polarization modulator is placed after the projector to modify the emitted image light into one or the other of two circular polarization states. As shown in FIG. 4 of Liptoh, the electro-optic polarization modulator is a pi-cell, surface mode, or push-pull type device that provides two serially positioned liquid crystal cell modulators that are driven electrically out of phase to stereo encode the transiting image light. One or more polarization retarders or polarizers can also be integrated into the device. As illustrated in FIG. 6 of Liptoh, the polarization modulator is located after, but proximate to, the projector, and provides the left-handed and right-handed circular polarized light in a time sequential fashion. A viewer wearing stereo glasses with a pair of left-circular and right-circular polarized lenses can then perceive stereo image content.

U.S. Pat. No. 8,177,366 to Lee et al., titled "Stereoscopic Image Projecting System Using Circularly Polarized Filter Module," provides a circular polarization filter or wheel having a sequence of left and right polarization filters, each of which includes a linear polarization filter and a polarization retarder (e.g., a quarter wave plate) that modifies incident image light to produce left-hand circular and right-hand circular polarized image light in alternating fashion as the device rotates. The circular polarization filter wheel (e.g., FIG. 5 in Lee) is located between the projector and screen (see e.g., FIG. 4 in Lee), and the projection image content is synchronized with the filter rotation such that left-hand and right-hand circular polarized image light is provided with the proper timing.

Even as the technologies for stereo projection have evolved and improved, other aspects of projection technology have likewise been changing. For example, in recent years, projection technology has been shifting from analog (film) to digital (using spatial light modulators), while lasers are beginning to replace xenon arc lamps as the light sources in cinematic projectors. These changes are improving image quality relative to resolution, contrast, brightness, and other attributes over the traditional experience seen in theatres. Notably, these changes are beginning to enable significant improvements to the projected image contrast, including intra-frame contrast, as described by the American National Standards Institute (ANSI) contrast ratio (or ANSI CR) and similar standards in other jurisdictions. However, the design of stereo projection systems has not kept pace, and the technology has not been adapted to maintain the high ANSI contrast that the new generation of projectors can produce, but rather it can cause the ANSI contrast to fall to levels below that of even the traditional film projectors. Thus, there are opportunities to improve the design of stereo image projection systems so that enhanced ANSI or intra-frame contrast levels can be achieved.

SUMMARY

In one example, a projection system includes a projection lens, a port window, and an enclosure. The projection lens can project image light along an image light path towards a port window and can redirect a portion of the image light away from the image light path as result of being scattered or reflected away from the image light path. The port window can transmit projected image light from the projection lens. The port window has a surface for redirecting a portion of the projected image light as result of being scattered or reflected away from the image light path. The enclosure is positioned between the port window and the projection lens to surround the image light path between the port window and the projection lens. The enclosure can absorb the portion of the image light redirected by the projection lens and can absorb the portion of the projected image light redirected by the surface.

In another example, a method for reducing or capturing stray light in a projector by a projector system includes projecting, by a projection lens of the projector, image light along an image light path toward a port window and redirecting, by the projection lens, a portion of the image light away from the image light path. The method can include transmitting, by the port window, projected image light from the projection lens and redirecting, by a surface of the port window, a portion of the projected image light. The method can include absorbing, by an enclosure positioned between the port window and the projection lens to surround the image light path between the port window and the projection lens, the portion of the image light redirected by the projection lens and the portion of the projected image light redirected by the surface.

In another example, a port window within a projection system includes a surface for redirecting a portion of projected image light received along a light path from a projection lens as a result of being scattered or reflected away from the image light path. The port window can transmit projected image light from the projection lens. The image light path can be surrounded by an enclosure positioned between the port window and the projection lens. The enclosure can absorb the portion of the image light redirected by the projection lens and can absorb the portion of the projected image light redirected by the surface.

DETAILED DESCRIPTION

Figure 1:
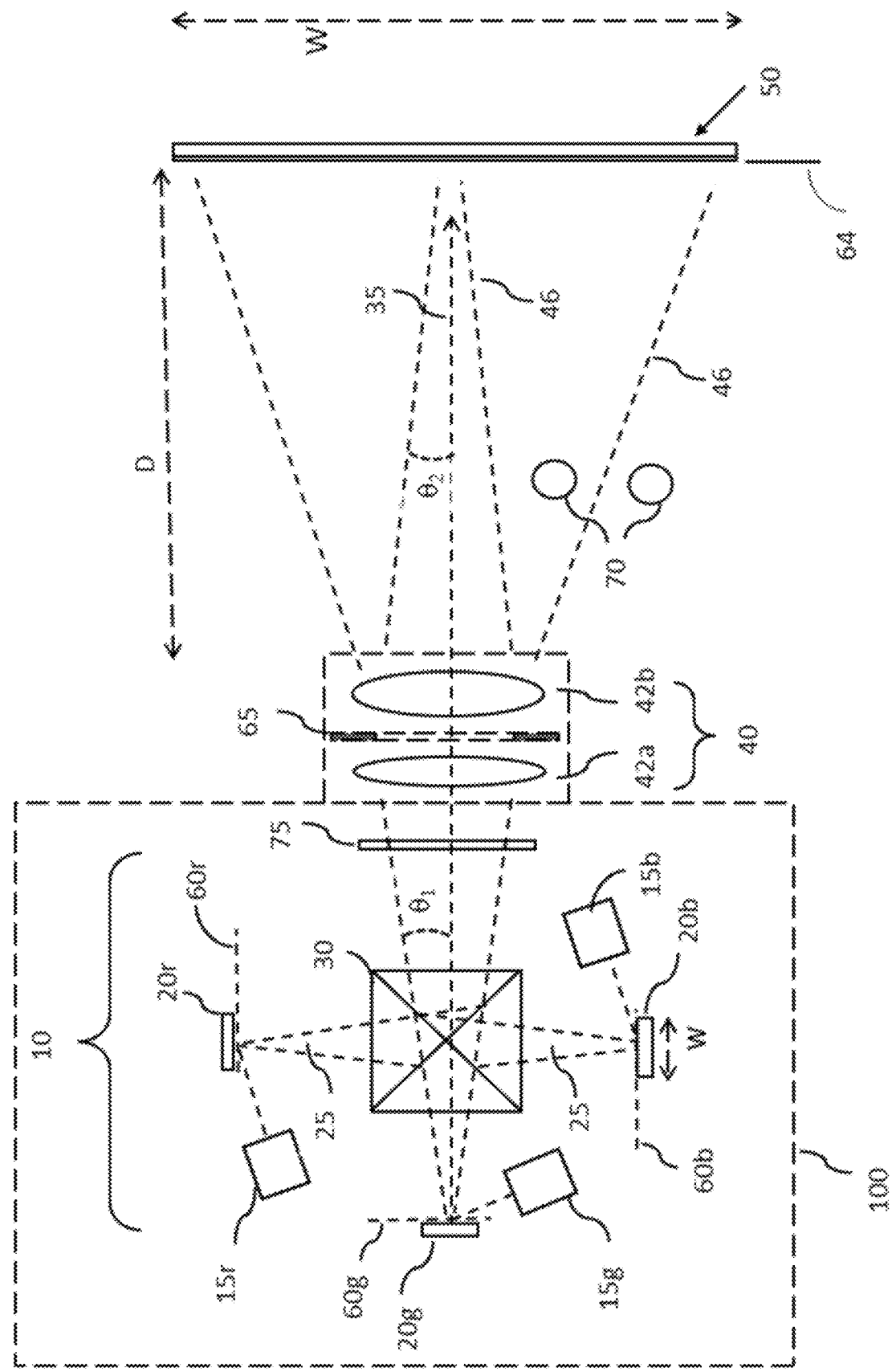
FIG. 1 depicts portions of a projection system and components of the projection system according to one example of the present disclosure.

Certain aspects and features of the present subject matter relate to a projection system that directs stereo image content to a display surface using an internally located stereo polarization modulator while avoiding intra-frame contrast degradation from using a stereo polarization modulator. In one example, the stereo polarization modulator is positioned between a spatial light modulator device and imaging optics in the projection system. The imaging optics can prevent part of the imaged light scattered by the stereo polarization modulator from being projected by the projection system, while allowing other light—e.g., intended light or light traversing a primary path of the projection system—to be projected. Doing so can reduce or avoid intra-frame contrast degradation of the projected imaged light that may otherwise occur because of the presence of the stereo polarization modulator. In this or as a separate example, the projection system can include an enclosure between a port window and a projection lens to absorb the portion of the light scattered by the stereo polarization modulator.

Elements, including those not specifically shown or described, may take various forms. Figures shown and described herein are provided to illustrate examples of principles of operation and component relationships along their respective optical paths according to some aspects of the present disclosure and may not show actual size or scale. Some exaggeration may be included to emphasize structural relationships or principles of operation. In some cases, components that normally lie in the optical path of the projection apparatus are not shown, to describe more clearly the operation of projection optics that are shown. Further, and unless otherwise explicitly noted or required, the word "or" is used in this disclosure in a non-exclusive sense.

Certain aspects and features of the present disclosure are inclusive of combinations of the examples described herein. References to a particular example and the like refer to features that are present in at least one example. Separate references to "an example" or "particular examples" or the like do not necessarily refer to the same example; however, such examples are not mutually exclusive, unless so indicated or as are readily apparent to one of skill in the art. The use of singular or plural in referring to the "method" or "methods" and the like is not limiting.

The term "f-number" (or F# or F/#) as used in the present disclosure has its conventional optical meaning as the ratio of the effective focal length to acceptance aperture diameter (F#=EFL/d). F-numbers are used to scale the width of a convergent to divergent cone of light, such that the smaller the F#, the larger the cone is angularly, and the greater the light carrying capacity of that cone of light. In general, relative to the optical system, the f-numbers discussed refer to the f-number for light collected by the projection lens (e.g., from the intermediate image plane) or the f-number for light incident to the display surface. The term "numerical aperture" (or NA) is also used, and has its conventional meaning, as twice the inverse of the F#(NA=1/(2*F#)). The numerical aperture is calculated directly using the angle (θ) described by light going from the base of the object to the internal edge of the limiting aperture (the aperture stop) [NA=sin(θ)≈θ (in radians)]. Collectively, the f-number and numerical aperture define the speed of an optical system such as a projection lens. For example, the larger the NA or smaller the F#, the larger the cone is angularly, and the greater the light carrying capacity or optical speed of the optics conveying that cone of light.

FIG. 1 is a schematic of a projector 100 with a projection lens 40 that can project image light beams 46 to form an image on a distant screen or display surface 50. Patrons or viewers 70, which can be positioned beneath the image light beams 46, can view the projected image on display surface 50. In cinema applications, the projector 100 can reside in a projection booth, and can project image light at a frame rate of 24 frame per second (fps) out through a port window (not shown) into the accompanying theater, to benefit the audience therein. Internally, the projector 100 has three or more color channels 10, typically red (R), green (G), and blue (B). Each color channel 10 has a light source 15r, 15g, and 15b and a corresponding spatial light modulator 20r, 20g, and 20b, respectively. In one example, the spatial light modulator 20r, 20g, and 20b are digital micro-mirror devices (DMDs), such as Digital Light Processor (DLP) spatial light modulators available from Texas Instruments, Inc. of Dallas, TX DMDs can modulate the incident illumination light on a pixel level. In an ON state, each micro-mirror can direct light towards a lens aperture stop 65 to create image light 25. In an OFF state, each micro-mirror can direct light towards a beam dump (not shown). Frame-sequential contrast can measure the light through the lens aperture stop 65 as a ratio of the ON state light to the leakage of residual OFF state light that was not trapped by the beam dump. For color projection, modulated emergent light from each spatial light modulator 20 can provide image light 25, which can be combined onto the same optical path, generally along a local optical axis 35, using a combining element such as a dichroic combiner 30. This same architecture can be used if the spatial light modulators are of another technology, such as liquid crystal devices (LCDs), with liquid crystal on silicon (LCOS) devices being an example thereof.

Each light source 15r, 15g, 15b can represent the appropriate color of filtered broadband light that originated from a light source such as a xenon lamp. FIG. 1 does not depict the xenon lamp, color filters, light integration optics, and appropriate color separation optics (e.g., a dichroic prism) that provides the illumination light corresponding to light sources 15r, 15g, 5b. Alternately, each light source 15r, 15g, 15b can be a narrow-band light source (such as a laser light source, an LED light source, or a superluminescent diode (SLEDs) light source) having a visible wavelength band characterized by a peak wavelength and a bandwidth providing some amount of energy over a small range of nearby wavelengths. For example, each light source 15r, 15g, 15b, respectively, can include a single high-power laser light source, or these sources can include multiple lasers that are combined onto a common optical path using free-space optics or optical fibers. Light emitted from the light sources 15r, 15g, 15b can be received into an image forming system, which in the case of FIG. 1, includes spatial light modulators 20r, 20g, 20b (such as DLP (digital micro-mirror) devices (DMDs)), a combining element (such as a dichroic combiner 30), and the projection optics (e.g., projection lens 40). Each spatial light modulator 20r, 20g, 20b lies at an object plane 60r, 60g, 60b, respectively, of a projection system, and, in this case, of projection lens 40. Projection lens 40 includes an illustrative pair of lens elements 42a, 42b. If the source light is initially polarized, the optics can be designed to either maintain the polarization quality, or to deliberately depolarize it. In the former case, with proper optics, the polarization quality can be maintained until the polarized image or illumination light encounters the stereo polarization switch.

In addition, each spatial light modulator 20r, 20g, 20b can be image conjugate to a displayed image plane 64, at display surface 50, where a screen can be located. Projected images from the spatial light modulators 20r, 20g, 20b can be magnified by the projection lens 40 with a magnification $m=\theta_2/\theta_1$, where $\theta_2$ and $\theta_1$ are angles that define the object and image plane numerical apertures relative to aperture stop 65. The numerical aperture can be calculated directly using the angle (θ) described by light going from where the local optical axis 35 intersects the object plane 60 to the edge of the limiting aperture (e.g., the aperture stop 65) [NA=sin(θ)≈θ (in radians)]. Also, the screen has a width "W," and is located a distance "D" in image space away from the projector. In the cinematic field, distance "D" is the "throw," and the throw ratio (T) can be defined as the ratio of the screen throw (distance D) to the screen width (W), such that T=D/W. The projector can provide an image to fill a projected field of view (FOV) that can be described by the actual physical size of the image on the screen (e.g., a projected width W'), a projected throw ratio T', the angular width to the screen edges (e.g., ±45°), or a combination thereof.

Each spatial light modulator 20r, 20g, 20b can include an array of square display pixels (not shown), which can be imaged by the projection lens 40 to the display surface 50, to form an array of on-screen projected image pixels. Each spatial light modulator 20r, 20g, 20b can create variable patterns of ON-state or OFF-state display pixels that correspond to the incoming image data thereto at a given point in time.

To enable stereo projection, the projector 100 can be further equipped with a polarization modulator 75 that can provide left and right polarization images, which can be perceived as fused stereo images by an observer wearing the appropriate stereo glasses. The polarization modulator 75 can be subsequently also referred to as the stereo polarization modulator, which can encode image light as stereo image light in two orthogonal polarization orientations. The left and right polarization images can be either linearly or circularly polarized, and a viewer can wear the appropriate glasses to view the polarized images. The polarization modulator 75 can be a push-pull, pi-cell, or surface mode type liquid-crystal (LC) type device (e.g., a Z-screen), an achromatic polarization liquid crystal switch, a rotating polarization wheel, or other type of device. Commercially available Z-screen type devices include the DepthQ polarization modulator from Lightspeed Design (Bellevue, WA), the Wave 3D from MasterImage (Hollywood, CA), or the RealD™ Pro LP (Beverly Hills, CA). A polarization wheel modulator device, the MI-Clarity 3D, is also available from MasterImage. These devices can also be integrated into a polarization conversion imaging system that can increase light efficiency and on-screen image brightness.

In other systems, a polarization modulator, with our without a polarization conversion system, is located between the projection lens 40, and the display surface 50, and is positioned in close proximity (within a few inches) to the projector, as that positioning can reduce the size and cost of the polarization modulator device, given that the image light is rapidly expanding outwards to fill an optically projected FOV on the screen. That modulator can be separately mounted on a pedestal, or mounted to the port window frame (not shown) or to external mounting features on the projector housing of frame. By comparison, the polarization modulator 75, according to some examples of the present approach, is positioned within the projector 100 to improve intra-frame contrast and polarization contrast. A portion of the image light beams 46 that transit the modulator (e.g., see FIG. 7) is turned into diffuse or stray light by optical scattering, diffraction, and reflections that occur within the modulator device. Although stray light can be generated by these optical mechanisms, the term "scatter" is also used herein to generally include or encompass various forms of diffuse or stray light. Positioning the stereo polarization modulator and baffles within the projection system can enable angularly or spatially selective blocking of this stray light. An aperture stop can provide angular filtering, while a field stop can provide spatial filtering, and other baffles can provide a combination of spatial and angular filtering.

Figure 2:
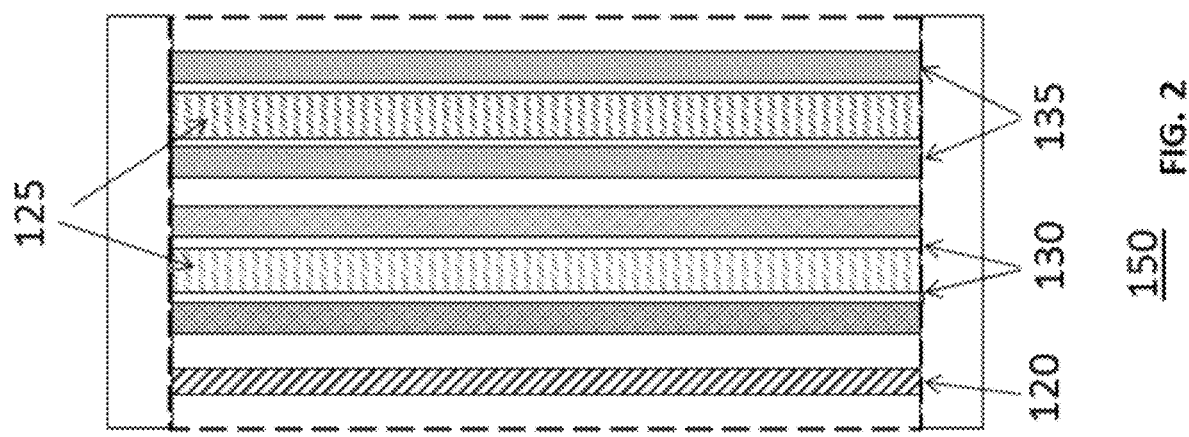
FIG. 2 depicts a liquid crystal-type polarization modulator according to one example of the present disclosure.

In greater detail, FIG. 2 depicts a LC polarization modulator 150 of a type that can function as the polarization modulator 75 in FIG. 1, and provide sufficient polarization contrast (e.g., ≥300:1) to provide polarized stereo image light encoded in two orthogonal polarization orientations for effective stereo perception. When used with a post-projection lens, this type of LC polarization modulator 150 can have an active area 8-12 inches in width, or 40-100 in$^2$ in area, depending on the design. Polarized stereo image light refers to imaged light that includes left-eye image light and right-eye image light in which the left-eye imaged light and the right-eye imaged light are polarized differently. LC polarization modulator 150 can be an electro-optical device that has a structure that combines to provide two serial push pull surface mode LC modulators (LC cells 125) with a linear polarizer 120. The incident image light is transmitted through the linear polarizer 120 and the LC cells 125 of the LC polarization modulator 150 are driven so that successive fields of alternately left-handed circularly polarized light and right-handed circularly polarized light can emerge. This polarization modulator 150, which is a Z-screen type device using surface mode liquid crystal and push-pull operation, has each of the two LC cells 125 introducing its own independent phase shift equivalent to a quarter wave retardation into the light beam emerging from linear polarizer 120. Each LC cell 125 can include a thin layer of liquid crystal polymer material positioned between two windows 135 that are coated with ITO electrodes 130. The pair of surface mode LC cells 125 can have orthogonal rub axes for LC alignment, and the linear polarizer 120 can have an absorption axis that bisects the orthogonal rub axes. A driver (not shown) can respond to synchronization pulses provided by the projector 100 and can provide drive voltages to LC cells 125 in synchronization with the sync pulses so that the polarized light emerging from LC cells 125 can be in synchronization with the image produced by the projector. The phase shifts provided by the two LC cells 125 can combine vectorially in a manner analogous to the functioning of a push-pull amplifier acting upon an oscillatory electrical signal, and the retardation of the resulting phase-shifted light can be substantially greater than would be produced absent one of the cells.

The LC polarization modulator 150 of FIG. 2 can include additional wave plates or retarders (e.g., a quarter-wave plate) and polarizers. This type of device may also include optimization of the alignment of the rub axes and the drive voltages, replacement of the absorption dye polaroid-type linear polarizer with a wire grid polarizer, and the use of polarization compensators. This type of device can also be used to switch the image light between two orthogonal linear polarization states, instead of between left-handed and right-handed circular polarization states. In that case, each viewer 70 can observe the image content through a pair of linear polarization stereo glasses. Also, other liquid crystal type devices can provide the functionality for polarization modulator 75 of FIG. 2. For example, a device with only a single LC cell, such as a ferro-electric liquid crystal (FLC) switch, can be used. As another example, the polarization modulator 75 can be an achromatic polarization switch that includes either a single rotatable smectic liquid crystal half-wave plate with a polarizer and two passive retarders (wave plates), or two achromatic liquid crystal variable retarders with a polarizer and two passive retarders.

Figure 3:
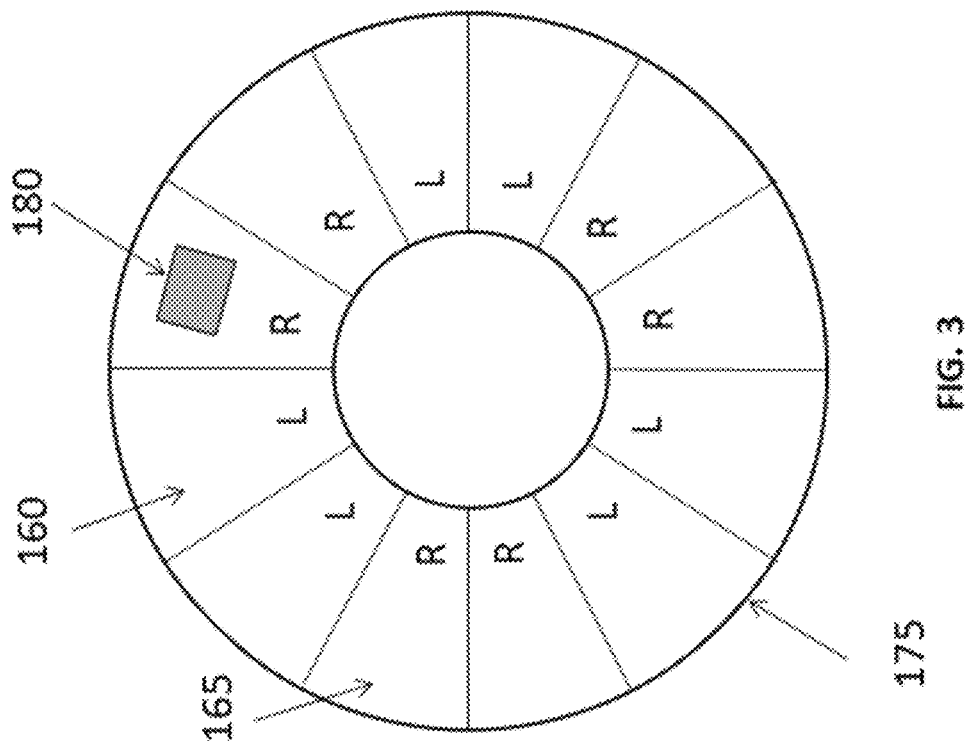
FIG. 3 depicts a segmented rotating disk-type polarization modulator according to one example of the present disclosure.

As an alternative to using a liquid crystal stereo polarization modulator to alternately encode image light as stereo image light that includes left-eye image light and right-eye image light, FIG. 3 depicts a polarization filter wheel 175 with polarization filters of a type that can function as the polarization modulator 75 in FIG. 1 and provide adequate polarization contrast for stereo projection. (The polarization filter wheel 175 may also be referred to as a "circular polarization filter.") The polarization filter wheel 175 or disk can be a circular structure that includes at least one left-image polarization filter 160 and at least one right-image polarization filter 165. The polarization filter wheel 175 can rotate at an appropriate rate to scan the filters past the projected image path (image area 180). Generally, each polarization filter (160 or 165) includes both a linear polarization filter and a quarter-wave plate or retarder to convert incident light into right-handed or left-handed circularly polarized light, which can be laminated onto a clear plastic or polymer substrate (not shown). A polarization filter wheel driver (not shown) can rotate the polarization filter wheel 175 according to timing synchronization of the left image emission and right image emission of the projector 100.

As shown in FIG. 3, the polarization filter wheel 175 can be segmented in alternating fashion (e.g., L, L, R, R) with twelve equally sized, fan-shaped, left-image polarization filters 160 and right-image polarization filters 165, arranged in paired groups of alternate polarization elements and affixed to a substrate. The alternate polarization elements can have other arrangements, including as single alternating filter segments (L, R, L, R, etc.), or consecutively positioned in just two groups (L, L, L, L, L, L and R, R, R, R, R, R), or alternating as four groups (e.g., L, L, L; then R, R, R; then L, L, L; and then R, R, R) with three left or right filter segments each. Using multiple smaller polarization filter segments can reduce the polarization errors or decrease stereo crosstalk for the viewers by reducing the mismatch between the angles of polarization orientation provided for the light passing through the polarization filter segment, corresponding to the polarization filters in the 3D glasses. Decreasing the number of left-eye/right-eye transitions in a rotation can decrease the transition times and improve light efficiency. But as the number of segments in a group of polarization filters is increased, the rotation rate of the polarization filter wheel 175 is reduced. The allowed transition time for transitioning a filter edge between a left and right filter segment to move through the image area 180 can impact the size of the wheel, relative to the number of filter pairs and the rotation rate. Also, synchronization of the image content, with appropriate blanking shutter in the imaged light path, can further reduce image crosstalk between the left and right eye images.

Projectors 100 can be developed or set up to satisfy various performance metrics, such as those relative to brightness, resolution, flicker, color gamut and color rendering, and contrast. In particular, the specification and publication of inter-frame (e.g., between frames), or frame sequential contrast, which measures the intensity ratio of a white frame to a black frame (CR=ON-state light/OFF-state light), with performance ≥5,000:1, is becoming increasingly common for projectors. Values of frame sequential contrast can be measured directly out of the projector or imaging optics, or with reflected light from the screen. The results of the latter measurement method can be reduced by the magnitude of ambient light in the local environment or theatre that is also reaching the optical detector. In the case of a projector with an added 3D sub-system, attributes such as polarization contrast and stereo leakage light may also be used to measure performance.

Projectors may also be benchmarked relative to intra-frame (e.g., within a single frame) contrast, or the relative tendency of image light directed to bright areas in a projected image frame, to "spill" into neighboring dark or black areas, due to scatter, diffraction, or reflections that redirect and diffuse a portion of the image light to other areas of the display surface. Intra-frame contrast can be measured using the light reflected off a screen or display surface. Measurements that may be better can be obtained using an optical detector aimed directly back towards the projector, as the measurements are less influenced by ambient light scattering around in the test environment. Intra-frame contrast can be measured with a variety of targets, including corner box contrast targets, or the ANSI "checker board" contrast target shown in FIG. 4 can be used. This ANSI contrast target 200 includes a pattern with sixteen equally sized white rectangular areas 210 and black rectangular areas 220. Luminance levels can be measured and reported as an average ANSI contrast, where the average illuminance measured in the center of reach of the bright rectangles is divided by the average illuminance for the measurements of the dark rectangles. In a digital projector, where it can be easy to switch images, both the ANSI target and an inverse image of the ANSI contrast target 200 can be imaged by the projector 100, and thus ANSI CR values for the sixteen rectangles can be individually tabulated. And the spatial variation of ANSI contrast can be examined at multiple coordinate positions ($x_1$, $x_2$) across the screen. Central ANSI contrast may be collected from measuring both bright and dark light levels for one of the four central rectangular areas of the ANSI contrast target 200. ANSI CR can be determined for a projector 100, with or without the polarization modulator 75, or other stereo polarization optics.

Figure 5:
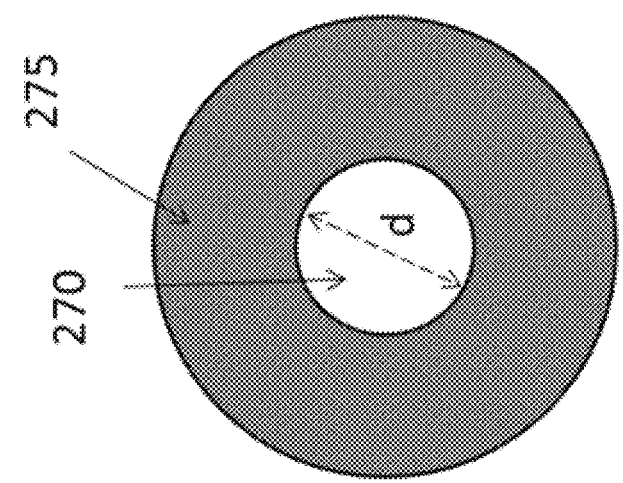
FIG. 5 depicts an aperture stop according to one example of the present disclosure.

In optics, an aperture is a hole or an opening through which light travels, with associated surfaces outside the hole that block or stop the light that misses the hole. An aperture stop 265 (see FIG. 5) is the stop that determines the ray cone angle, or the system f-number (e.g., F/4) collected from an object or light source or area, or projected to an image location or area. By selectively blocking light, a physical aperture stop 265 in an imaging lens can define the ray angle of the light ray that gets through the lens. And, as lens designs are optimized to limit and balance the aberrations of the lens for the imaging rays that pass through the aperture stop 265, the size (diameter, "d") of the aperture stop opening 270 (which is usually, but not always, a circular hole) can contribute directly to the image quality provided by the lens. The aperture stop 265 can block stray light, such as light that misses the intended aperture stop opening 270 and hits the light blocking surface 275. By blocking stray light, the aperture stop 265 can contribute to angular filtering (angularly selective blocking or transmission of light) and improvement in the intra-frame image contrast. During optical design, optical elements are also determined to have one or more clear apertures, which can define the portions of an outer optic surface that light intentionally traverses, and that, for example, can define an area of the optic that would benefit from an anti-reflection (AR) coating.

High-contrast performance from projectors can improve image quality not only with respect to the dynamic range from black to white, but also relative to resolution (MTF), and the volume of renderable color space. Also, the value of very high frame-sequential contrast (e.g., ≥100,000:1) can be substantially reduced when projector ANSI contrast is low, except where the image content has only a few highlights in an otherwise very dark scene, such as in a scene with a scattering of stars in deep space. Historically, motion picture film projectors provided frame sequential contrast of >5,000:1 with print film, but ANSI contrast performance of only ≈200-300:1. As film projectors have been increasingly replaced by electronic or digital projectors, the frame sequential contrast has varied widely (2,000-100,000:1) depending on the technology, but ANSI contrast has typically remained in the same low 200-300:1 range. Digital projector ANSI CR, however, is also beginning to improve, and ANSI CR values of approximately 700:1 or greater have been rarely reported.

A stereo polarization modulator can experience multiple mechanisms, including light scatter from dust and internal structures, and from back reflections scattering off the projector that can reduce the projected intra-frame contrast. Certain aspects and features of the present approach can provide a projection system where atypically high ANSI CR (e.g., ≥800:1) can be provided, and deliberate extra efforts can be employed when combining the projector with a stereo polarization modulator. Care can be applied, as high ANSI or intra-frame contrast, once obtained, can then drop dramatically when light scattering optics (e.g., the polarization modulator) or even dirty optics are used within the projector.

Figure 4:
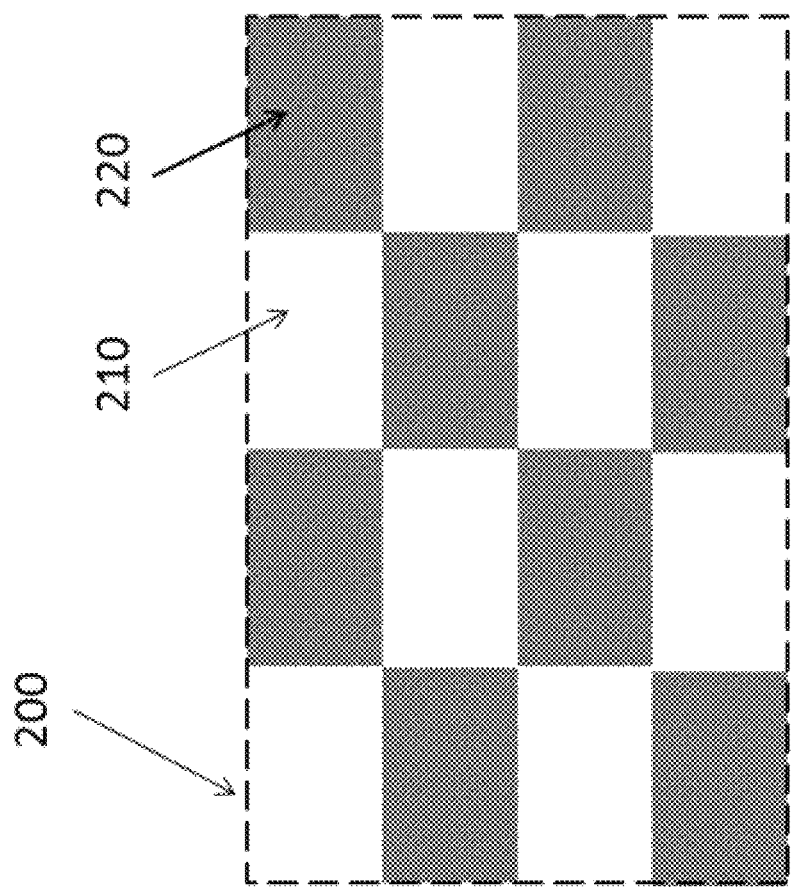
FIG. 4 depicts an ANSI contrast target used to measure intra-frame contrast according to one example of the present disclosure.

The measured values of ANSI CR in projected images can be influenced by light scattering, diffraction, reflections, or ghosting as light interacts with various surfaces, including the modulators 15 (e.g., the DMDs), filters, mirrors, projection lenses, and other optics, resulting in diffused image light that spills into the black rectangular area 220 of FIG. 4. The sides of optics can be blackened with black paint, or other light absorbing coatings. The inner surfaces of optical housings and lens barrels, including baffles or light traps, can also be blackened with black anodize (e.g., Avian Black), as well as the outside surfaces of lens apertures at aperture stops 65. This can yield typical measured ANSI contrast values in the 200-300:1 range. An optical housing or lens barrel (e.g., see FIG. 16) is typically a rigid structure that encloses, protects, and supports not only the optics, but also the baffles and other light trapping surfaces or features therein. For example, baffles, aperture stops, field stops, and inner housing surfaces can have blackened and threaded, corrugated, or textured surfaces, where the undulations of these light trapping surfaces help confine and reduce stray light with multiple consecutive light absorbing reflections.

In providing stereo projection with polarization modulators 75, little concern has been directed to their impact on intra-frame contrast generally, or ANSI contrast in particular. As projector ANSI contrast improves, however, these devices can have greater noticeable impact than previously experienced. For example, the measured intra-frame contrast in projected images from an atypical projector providing ≥800:1 frame average ANSI contrast, dropped to only 160:1 when a stereo polarization modulator is used in front of the projector.

These polarization modulator devices can contribute to reducing ANSI contrast from multiple mechanisms or scattering elements, including from dust, debris, and other contaminants landing on these polarization modulators 75 as they sit exposed to unfiltered air in the projection booth or theatre environment. Internally, polarization films and retarder films can also contribute light scattering from surface defects and internal inhomogeneities, including from fiber-like structures or patterns created during film drawing or rolling. Also, in liquid crystal devices, the windows can be deliberately spaced to control the cell thickness of the LC cells 125 of FIG. 2, and thus the polarization uniformity of the device; for example, to provide a uniform, 10-micron cell gap across a device spanning several inches or more. This liquid crystal cell spacing or cell gap can be controlled by the use of posts, spacer rods, or spacer beads or particles, typically made with clear polymer or glass. Such spacers, and particularly the clear spacer beads, however, can be light-scattering elements that can cause significant reduction in the projected intra-frame contrast or ANSI contrast.

For increased robustness, some polarization modulators 150 of the LC type depicted in FIG. 2 substitute a wire grid polarizer (having metal wires on glass) for the polymer/dye-type polarizer in providing the function of linear polarizer 120. However, the wire grid polarizer can both back-reflect and scatter light. If the modulator and wire grid polarizer are positioned between the projection lens 40 and screen, this back-reflected light can illuminate the front surface of the projector 100. Even if the wire grid polarizer is tilted, enough of this light can then scatter off the front surface of the projector 100 and diffusely propagate to the screen to significantly reduce the intra-frame contrast, including the measured ANSI contrast. Although better blackening of the front surface of the projector may help intra-frame contrast, the improvements can be inadequate when the intra-frame contrast of the projector is particularly high.

Figure 6:
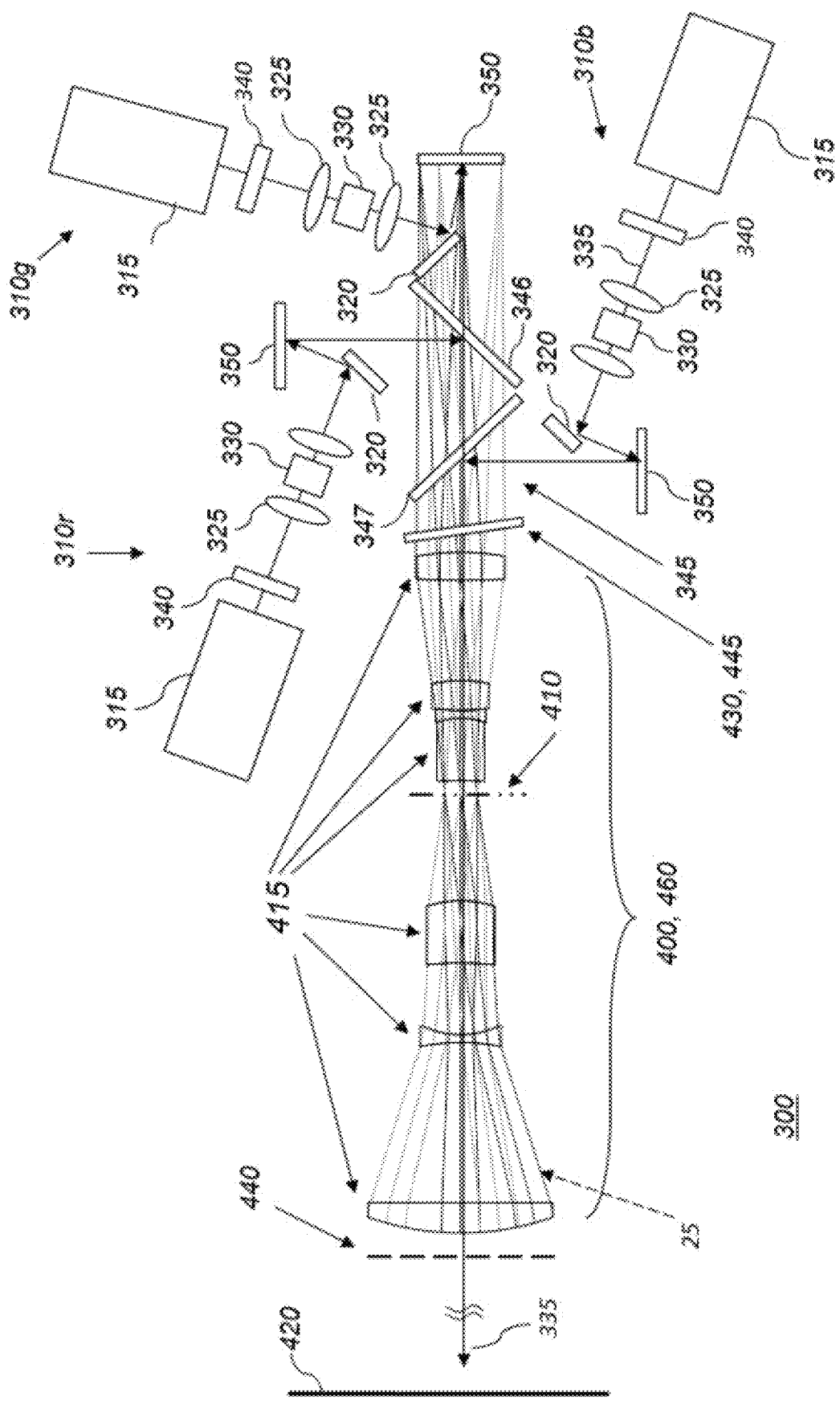
FIG. 6 depicts a projection system with a stereo polarization modulator for improved intra-frame contrast according to one example of the present disclosure.

Certain aspects and features of the present approach provide a projector with a stereo polarization modulator that enables stereo image perception and maintains the intra-frame contrast of the projected images compared to levels equivalent or nearly equivalent to the levels seen without the polarization modulator present. As an example, FIG. 6 depicts a schematic diagram for a projector 300 that includes three illumination assemblies 310*r*, 310*g*, and 310*b*, with each providing one of the primary Red, Green, or Blue (RGB) colors from a respective light source assembly 315. The light source assemblies 315 can include one or more light sources, which, in this example, are laser light source devices. Illumination light is directed onto spatial light modulators 350 by redirection with one or more mirrors 320. Modulated image light, which includes image data imparted into the transiting light by the addressed pixels of the spatial light modulators 350, is combined to traverse a common optical path, including optical axis 335, and pass through imaging optics 400 and onto a display surface 420 (such as a projection screen). The projector 300 can be tilted, or the imaging optics 400 used with an offset, or a combination thereof, to aim the projected image downwards from the projection booth and towards the screen.

In greater detail, the illumination assemblies 310*r*, 310*g*, and 310*b* of FIG. 6 typically include one or more illumination lenses 325, a light integrator 330 (such as a fly's eye integrator or integrating bar, for example) that shapes and direct the transiting light beams, and further illumination lenses 325 and mirrors 320, that together direct illumination light along an optical axis 335 to an associated spatial light modulator 350. The mirrors 320 need not lie in the plane of the optical system. For example, the mirror 320 in the optical path for the green channel can be out of plane and not obstructing light passing to imaging optics 400, as might be otherwise implied by FIG. 6.

In the projection system of FIG. 6, a dichroic combiner 345 includes a first combiner 346 and a second combiner 347, each of which is a dichroic element having appropriate thin-film, optical coatings that can selectively transmit or reflect light according to its wavelength. While dichroic combiner 345 is shown as a pair of tilted glass plates, other examples of constructions can be used, including X-prisms, V-prisms, or Philips (or Plumbicon) type prisms. Mirrors 320 can also be provided in the form of prisms, such as the widely used TIR (total internal reflection) prism that can be used in combination with the Philips prism and DLP devices.

In the projector 300 of FIG. 6, imaging optics 400 are depicted as a multi-element assembly or projection lens 460 with multiple lens elements 415 and an aperture stop 410 that images or projects light from spatial light modulators 350*r*, 350*g*, and 350*b* at their respective object planes directly onto an image plane (display surface 420) at high magnification (typically 100×-400×). In theaters providing stereo content, the screen can be a high-gain screen, with a silvered or nano-particle surface structure that preserves polarization of the incident light as it is reflected. To encode image content for stereo (3D) viewing with left-eye image light and right-eye image light, and aid intra-frame contrast with projected polarized stereo image light 25, the stereo polarization modulator 430 is shown located at an internal position 445, prior to the imaging optics 400, but after the dichroic combiner 345. The stereo polarization modulator 430 can be either a liquid crystal or polarization wheel device. If this function is positioned even earlier in the system, such as prior to dichroic combiner 345, then multiple stereo polarization modulators 430 may be used.

Certain aspects and features of the projector 300 can provide a stereo polarization modulator 430 at an internal position 445 within the projector 300 and that is located along the optical path or optical axis that is prior to the imaging optics 400. Stray light created by the stereo polarization modulator can have room to propagate away from the remaining image light and encounter baffles or light traps (e.g., the blackened inner surfaces of the lens barrel) and the light blocking surface 275 of the physical aperture stop 265, which can contribute to blocking or angular filtering this stray light. The stereo polarization modulator 430 can also be located within the imaging optics 400, for example at the aperture stop 410, although the projector opto-mechanics can contribute less to blocking stray light created by the stereo polarization modulator 430. In other polarization switching stereo projectors using an LC-type polarization modulator or a polarization modulator that is a wheel, the polarization switch is located external to the projector, in image space, at or near an external position 440 that is proximate to the last lens element 415 of imaging optics 400, and scattered light from the modulator can readily propagate to the screen. Although in such circumstances, tilt of the modulator can help intra-frame contrast, externally mounting and using a stereo polarization modulator 430 can be constrained to have the device aligned near normal to the optical axis 335 of the projected image light, as the modulator is modifying highly divergent light and the device performance is angularly limited.

Figure 7:
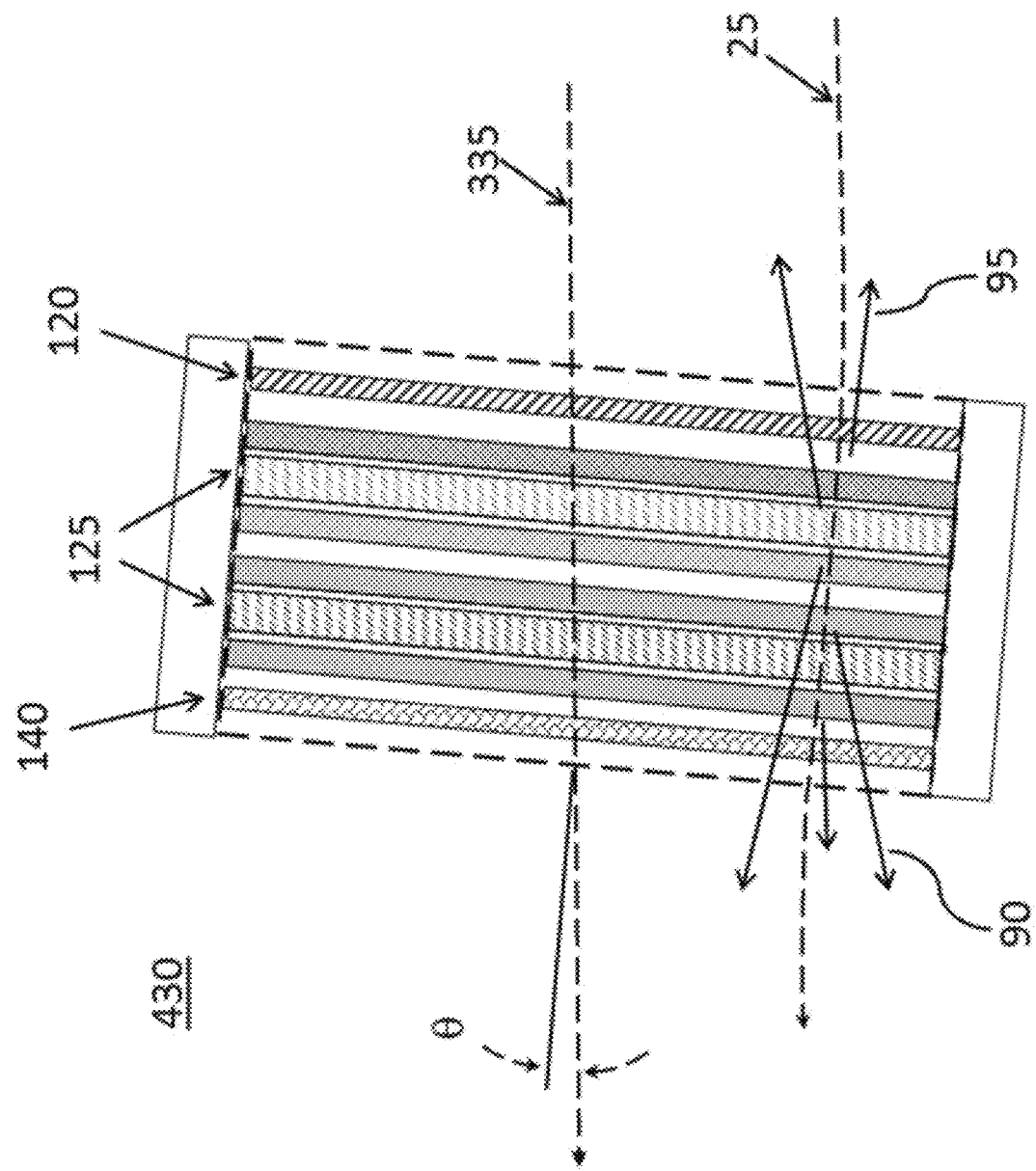
FIG. 7 depicts a stereo polarization modulator usable in the projection system of FIG. 6 according to one example of the present disclosure.

In the context of the projector 300 of FIG. 6, the stereo polarization modulator 430 can provide improved intra-frame or ANSI contrast as a result of several different design changes, operating individually or in combination. As context, FIG. 7 depicts image light 25 incident to a stereo polarization modulator 430, and both scattered light 90 and back-reflected light 95 being emergent from different internal regions of the device and headed in various forward and backward directions about the primary or intended path of the image light. As one option to aid intra-frame contrast, the stereo polarization modulator 430 can be upgraded with better materials that have less scatter, so that less stray light is generated. For example, currently these devices can include fixed retarders (wave plates) or compensators comprising polymer films. While such films are typically inexpensive, they can have both surface defects and internal inhomogeneities that can cause light scatter. However, with the stereo polarization modulator 430 located at an internal position 445 to the projector 300, the modulator device can be small enough (e.g., 1-6 in$^2$) that more expensive materials with better optical quality can be used. These changes can also enable the wave front quality of the stereo polarization modulator 430 to be improved, if necessary, to help reduce image quality (MTF) degradations that the device may cause when positioned within the projector.

For example, a polymer retarder or wave plate can be replaced with an achromatic quartz wave plate, which may be a more robust material that is less sensitive to thermal damage. Alternately, the retarder can include a polymer retarder attached to a robust, thermally conductive, optically transmissive substrate such as ALON® from Surmet Corp., Burlington MA, which can then be air or liquid cooled. ALON® is a high index sapphire-like optical ceramic that is optically birefringent. A window of ALON® of 1.0 mm to 1.5 mm thick may be able to adequately preserve polarization contrast.

Likewise, the projected intra-frame ANSI contrast of a projector equipped with an LC type stereo polarization modulator 430 can be improved by modifying the construction of the LC cells 125. For example, large-area devices can use spacer beads to control the cell gap thickness, but these spacer beads can cause significant geometrical light scatter, reducing intra-frame contrast. As a LC type stereo polarization modulator 430 located at an internal position 445 within the projector 300 can be appreciably smaller than an externally located device at an external position 440, other cell gap spacing methods can be used. If the device is small enough, the cell gap can be maintained near the outer edge of the optical clear aperture with an outer frame mounting method. Alternately, the cell gap can be maintained with spacer posts, for example formed by a photo masking process. As spacer posts can be smaller, more uniform in size, and more sparsely distributed than spacer beads, the amount of optical scatter can be reduced. Spacer density (spatial distribution), shape, and other properties can also adjusted to reduce light scattering and improve intra-frame contrast. Additionally, the spacer beads or posts can be fabricated to be dark or light absorbing (e.g., have increased optical density), to scatter less light. The thermal risks of damage to the stereo polarization modulator 430 can be reduced by switching from the glass for typical windows, which in LC devices can be selected for low cost and durability, to alternate materials that can be provide better thermal performance. For example, fused silica can be used instead, as it has atypically low visible optical absorption. Alternately, the LC cell window glass can also be made from ALON®, and cooled to pull heat from the device to benefit the LC polymer materials inside. The outer optical surfaces or windows of the stereo polarization modulator 430 can also be anti-reflection coated to reduce back reflections that can subsequently affect both intra-frame contrast of image resolution (MTF).

Not only can the detrimental effects of the stereo polarization modulator 430 on the intra-frame contrast of the projector 300 be improved by physical changes to the construction of the device, but careful placement and tilting of the device within the projector 300 can also be beneficial. For example, FIG. 6 depicts the stereo polarization modulator 430 at an internal position 445 and tilted relative to the local optical axis 335. FIG. 7 depicts a stereo polarization modulator 430, residing in an optical path of an optical system, being tilted by an angle θ away from being normally aligned to the local optical axis 335. Additionally, if the linear polarizer 120 is a wire-grid polarizer type of optical device, it can be separated from the integrated stereo polarization modulator 430 device and located elsewhere in the projection system.

Figure 8:
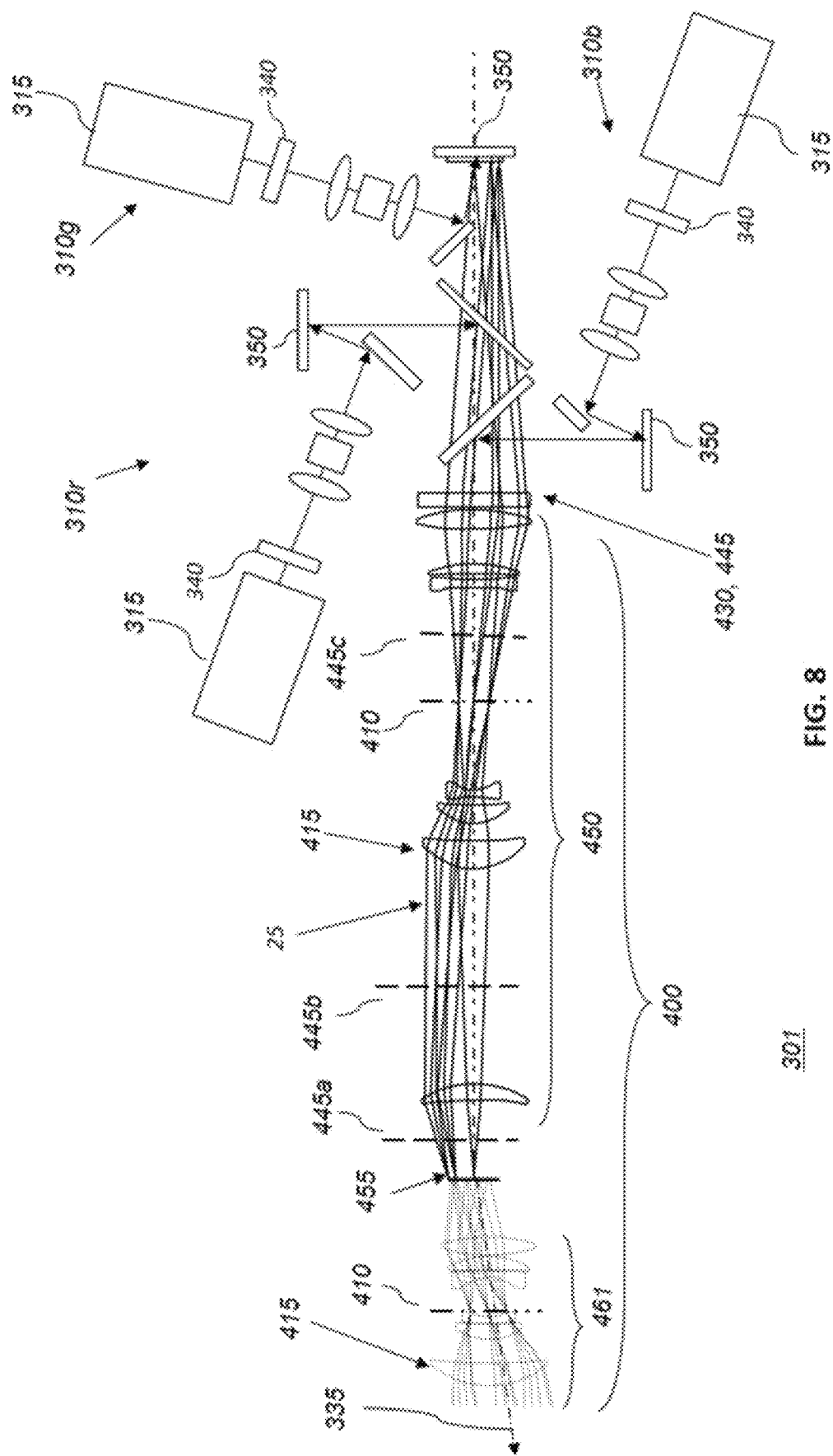
FIG. 8 depicts a projection system with a refractive relay and a stereo polarization modulator for improved intra-frame contrast according to one example of the present disclosure.

Although the optical architecture of the projector 300 of FIG. 6 can allow the aforementioned tilt and relocation changes to the stereo polarization modulator 430, the available space can be limited. By comparison, FIG. 8 depicts an alternate construction for a projector 301, compared to the imaging optics 400 of FIG. 6, which can have a long working distance projection lens 460. The optics 400 of FIG. 6 can be replaced by a combination of a relay lens 450 and projection lens 461. The use of relay optics in a projector can be useful in reducing the cost of the projection lens 461, as the projection lens that is paired with a relay may not be required to provide both a short focal length (for high magnification) and a long working distance or long back focal length (to provide space of the beam combing optics). The relay lens 450 images the spatial light modulators 350 to an intermediate image plane 455, which is turn reimaged by the projection lens 461 to the distant display surface or screen (not shown), with a downward orientation as indicated by optical axis 335. In this example, both relay lens 450 and projection lens 461 assemblies include multiple refractive lens elements 415. Although the relay lens 450 depicted in FIG. 8 (with light illustrated as generally travelling left to right) has a field lens element proximate to the intermediate image plane 455, relay lens configurations that provide image light telecentrically to the intermediate image plane 455 can also be used. The optical flux density or optical power density at or near an intermediate image plane 455 can be high, depending on both the total lumen output of the projector, and the image content at a given time. For example, as the optical power density near the intermediate image plane can be as much as 2-30 W/cm$^2$, care can then be used in the design of a stereo polarization modulator 430 so that it can survive these light exposure levels.

Using relay optics can be useful for improving intra-frame contrast in an imaging system, as the elongated optical path length can allow for additional light blocking and absorbing (e.g., black) surfaces such as baffles, masks, and light traps. For example, in the system of FIG. 8, two aperture stops 410 are depicted, and although only one of them is the limiting aperture that defines the system f-number, both apertures can contribute to stray light blocking or angular filtering. Thus, when introducing an internal stereo polarization modulator 430, and a linear polarizer thereof, to the projector 301 having relay optics, there are additional opportunities to position these components to reduce intra-frame contrast loss. In the example system shown, the stereo polarization modulator 430 is located at an internal position 445 on the input side of the relay lens 450, and both aperture stops 410 can help attenuate the scattered or stray light that is lost as useful image light 25. Alternate internal position 445c has similar properties. However, the stereo polarization modulator 430 can be located elsewhere internally, including at the other illustrated internal positions 445a and 445b where only one aperture stop 410 can then contribute to stray light blocking.

Figure 9:
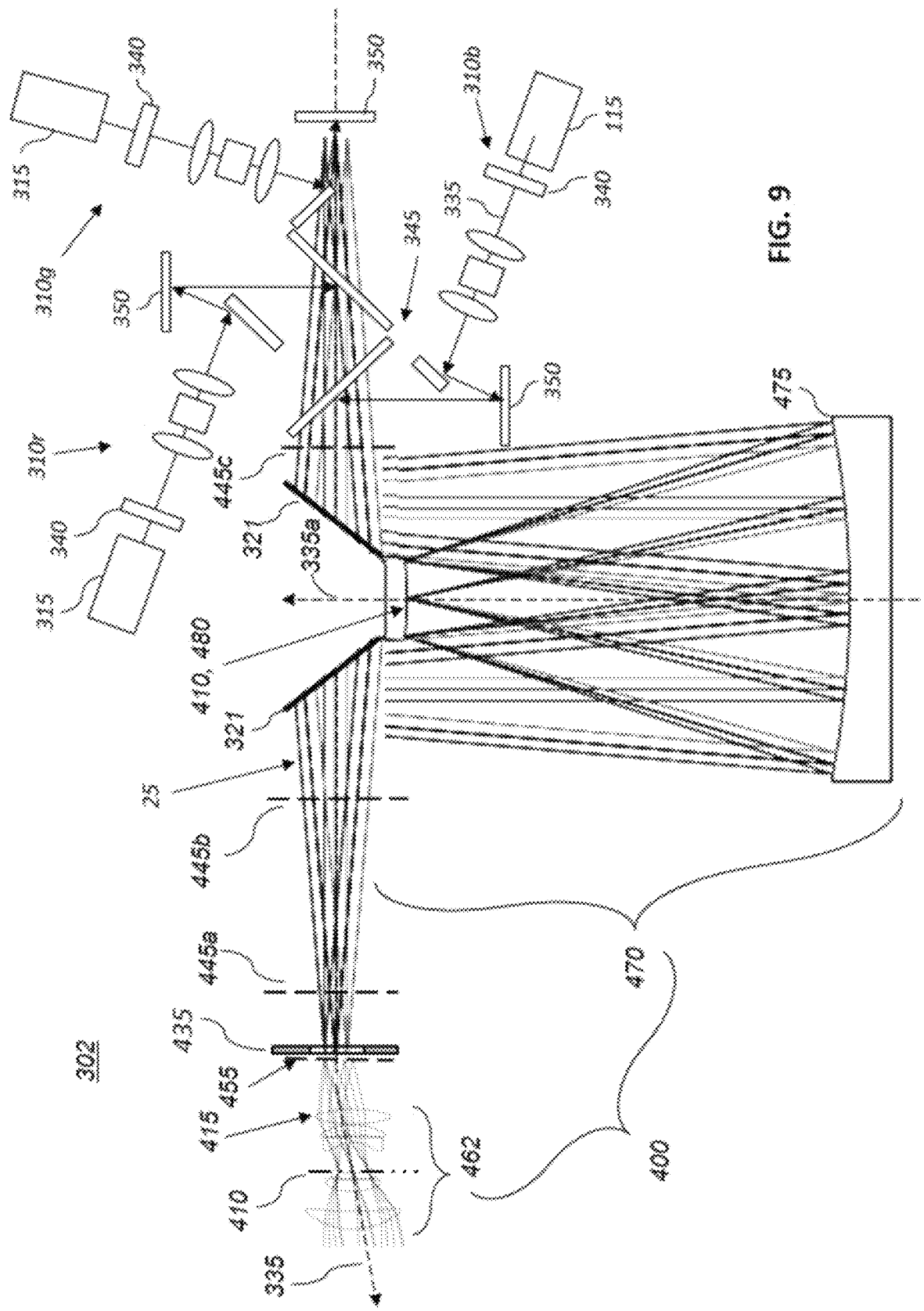
FIG. 9 depicts a projection system with a refractive relay and a stereo polarization modulator for improved intra-frame contrast according to one example of the present disclosure.

Similarly, FIG. 9 depicts an alternate construction for a projector 302, in which the imaging optics 400 of FIG. 6, which was a long working distance projection lens, has been replaced by a combination of an Offner relay 470 and a projection lens 462. The Offner relay 470 is a catoptric imaging system that includes a primary mirror 475 and a secondary mirror 480. The Offner relay 470 of FIG. 9 can be complimented by two fold mirrors 321, one to collect image light 25 from the object (spatial light modulators 350), and the other to direct image light toward the projection lens 462. The primary mirror 475 and the secondary mirror 480 can share a common optical axis 335a, for which aperture stop 410 is on-axis, but the field (object and image) are "off-axis." The design performance can then be optimized over an annular region between a minimum and a maximum radial field, and the image light can be telecentrically incident to the intermediate image plane 455, which is then reimaged by the projection lens. That is, with the concentric layout and folds from mirrors 321, the area of best image quality at the intermediate image plane 455 is annular, and centered around the optical axis 335. Offner relays 470 nominally work at unity magnification, but can deviate modestly (e.g., ~1.04×) with minimal degradation in the imaging performance. The Offner relay 470, or the housing thereof, can also be equipped with baffles, masks, and light traps (all not shown), including primary and secondary mirror masks that provide blocking at the mirror edges, to reduce the magnitude of stray light. Similarly, a field stop 435 can be positioned proximate to the intermediate image plane to block stray light that may be outside the area of the intermediate image itself. Alternately, the relay optics, as represented by the relay lens 450 or the Offner relay 470, can be modified to be a hybrid or catadioptric system, including both refractive and reflective imaging optics.

Figure 10:
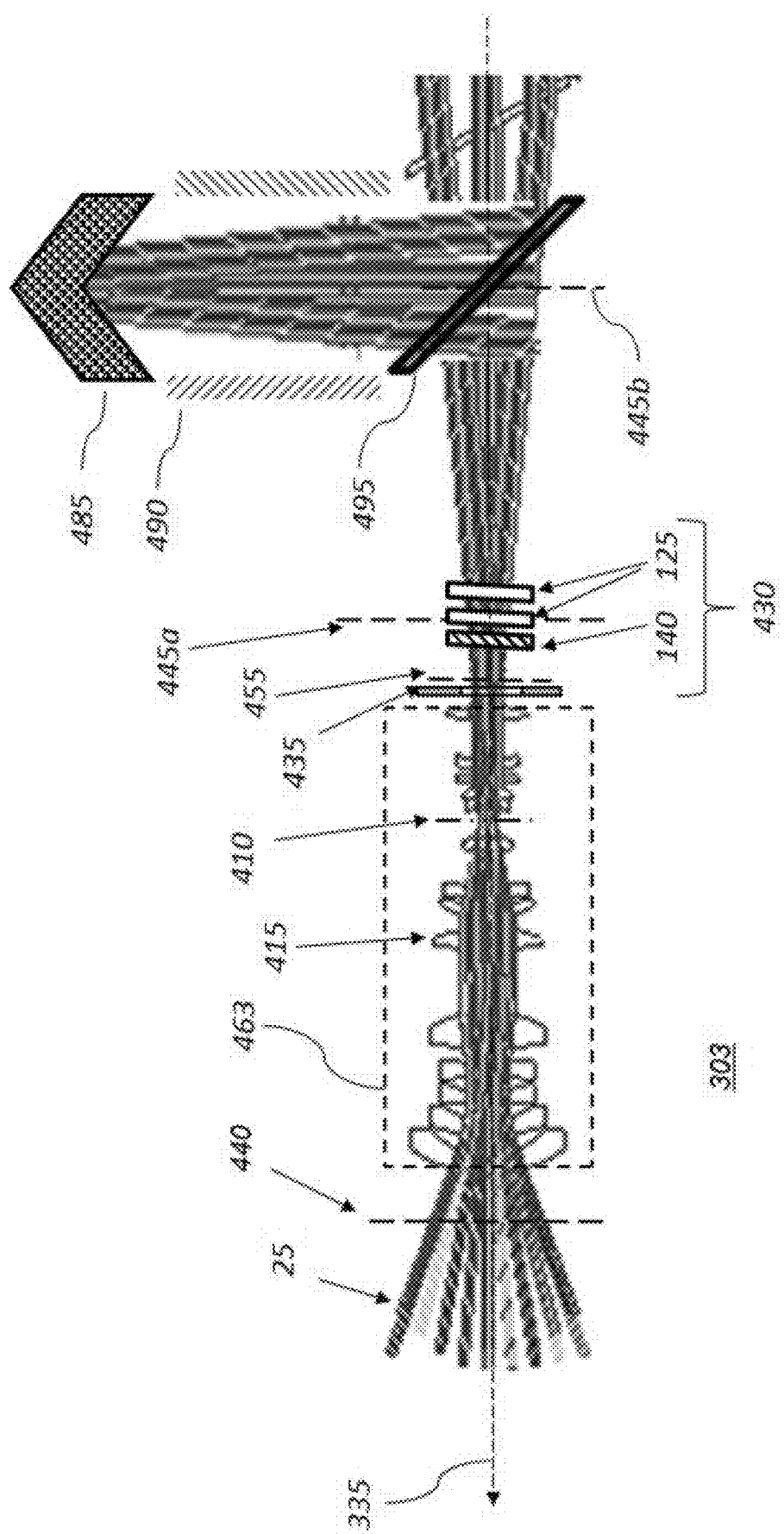
FIG. 10 depicts a projection system with a stereo polarization modulator and a polarization beam splitter located near the intermediate image created by relay optics within the projector according to one example of the present disclosure.

Although the stereo polarization modulator 430, which can transform the non-polarized image light into polarized left-eye image light and right-eye image light, can be located in the input side of the Offner relay 470, at internal position 445c that is proximate to the dichroic combiner 345, it can be easier to locate the modulator in the optical path in the output side of the Offner relay, as indicated by internal positions 445a and 445b. For example, FIG. 10 depicts a portion of a projector 303, and a portion of the imaging optics 400 thereof, with output image light 25 from relay optics coming to a focus at an intermediate image plane 455, which in turn is reimaged by a projection lens 463. The imaging optics 400 includes the relay optics (not shown) and projection lens 463. To reduce ANSI contrast loss, the stereo polarization modulator 430 can be positioned and tilted at an internal position 445a in the optical path that is in the general vicinity of the intermediate image plane 455. A field stop 435, located proximate to the intermediate image plane 455, can be included to assist stray light blocking. As shown, the integrated stereo polarization modulator 430 includes two LC cells 125 and a retarder 140. However, while the linear polarizer can remain integrated in this device, power density concerns can favor wire-grid devices over absorptive ones, but then the back reflections and scatter can be carefully controlled. In some examples, the polarizer is separated from the stereo polarization modulator 430 and located at a preceding internal position 445b. As shown, a wire-grid plate polarization beam splitter (PBS) 495 is a polarizing element that can act as a pre-polarizer and transmits image light 25 of one polarization towards the stereo polarization modulator 430, and that can reflect the image light of the orthogonal polarization state towards a beam dump 485 to be absorbed. The PBS 495 may not be needed if the incoming image light is already pre-polarized, although a clean-up polarizer or PBS can be used if the prior polarization qualities (e.g., contrast, orientation, uniformity) from the light source(s) are not fully maintained. By directing the unused, reflected, and scattered, image light into the beam dump 485, as complemented by appropriate light baffles 490, little of the unused light may scatter into the optical path and effect intra-frame contrast. Internal housings or enclosures (not shown), with seals or gaskets, can be used to keep the stereo polarization modulator 430, and other internal optical surfaces, clean from dust and other contaminants.

Although both the LC cells 125 and the retarder 140 contribute to light scatter and intra-frame contrast loss as they transform the non-polarized image light into polarized stereo image light, the LC cells can be the dominant contributor to scattering. Thus, it can be acceptable to leave the LC cells 125 at an internal position 445, separate the retarder 140 from the integrated device, and move the retarder 140 to an external position 440. The optical power density exposure concerns for the retarder 140 can be lessened. An externally mounted retarder can be readily removed or switched out for 2D shows, and likewise readily replaced or cleaned. By comparison, when switching from display of 3D to 2D image content with a projector 303 of the type of FIG. 10, the temporary removal of both the stereo polarization modulator 430 and the polarization beam splitter 495, and the insertion of any appropriate optical path length compensators, may be more mechanically difficult. Thus, if scattering of light from the stereo polarization modulator(s) 430 is adequately controlled, the modulator(s) can be left in the system for both 2D and 3D operation, although during 2D image projection, they can be dormant. However, the polarizer may still need to be removed, unless the projector is constructed with the two-lens approach of FIG. 11. Alternately, a movable assembly (not shown) can be used to shift both the stereo polarization modulator 430 and the polarization beam splitter 495 out of the optical axis 335, and shift the appropriate optical path length compensators into the optical axis 335.

The polarizing element, typically a polarization beam splitter as in FIG. 10, can be a plate wire grid PBS (as shown), a prism imbedded wire grid PBS, a dichroic plate polarizer, a Mac Nielle prism, a double dove thin film total internal reflection (FTIR) prism, or other type of polarization beam splitter. The wire-grid plate PBS is thermally robust and relatively angularly insensitive, as compared to the Mac Nielle prism. Whereas, the PBS with the wire grid embedded in a cubic glass prism, the astigmatism from a tilted plate is removed, but the wires are imbedded in adhesive, changing the refractive indices reducing the visible contrast performance. A more optimal device can then have the wire spacing reduced (below 100 nm) to compensate. Furthermore, for a high power application like cinematic projection, use of more thermally robust materials for the prism glass (e.g., fused silica) and a compliant adhesive or chemical bonding can be useful in the either or both the polarization beamsplitter and the stereo polarization modulator. These material improvements can also be applied to the double dove thin film total internal reflection (FTIR) prism or other prism constructions.

Figure 11:
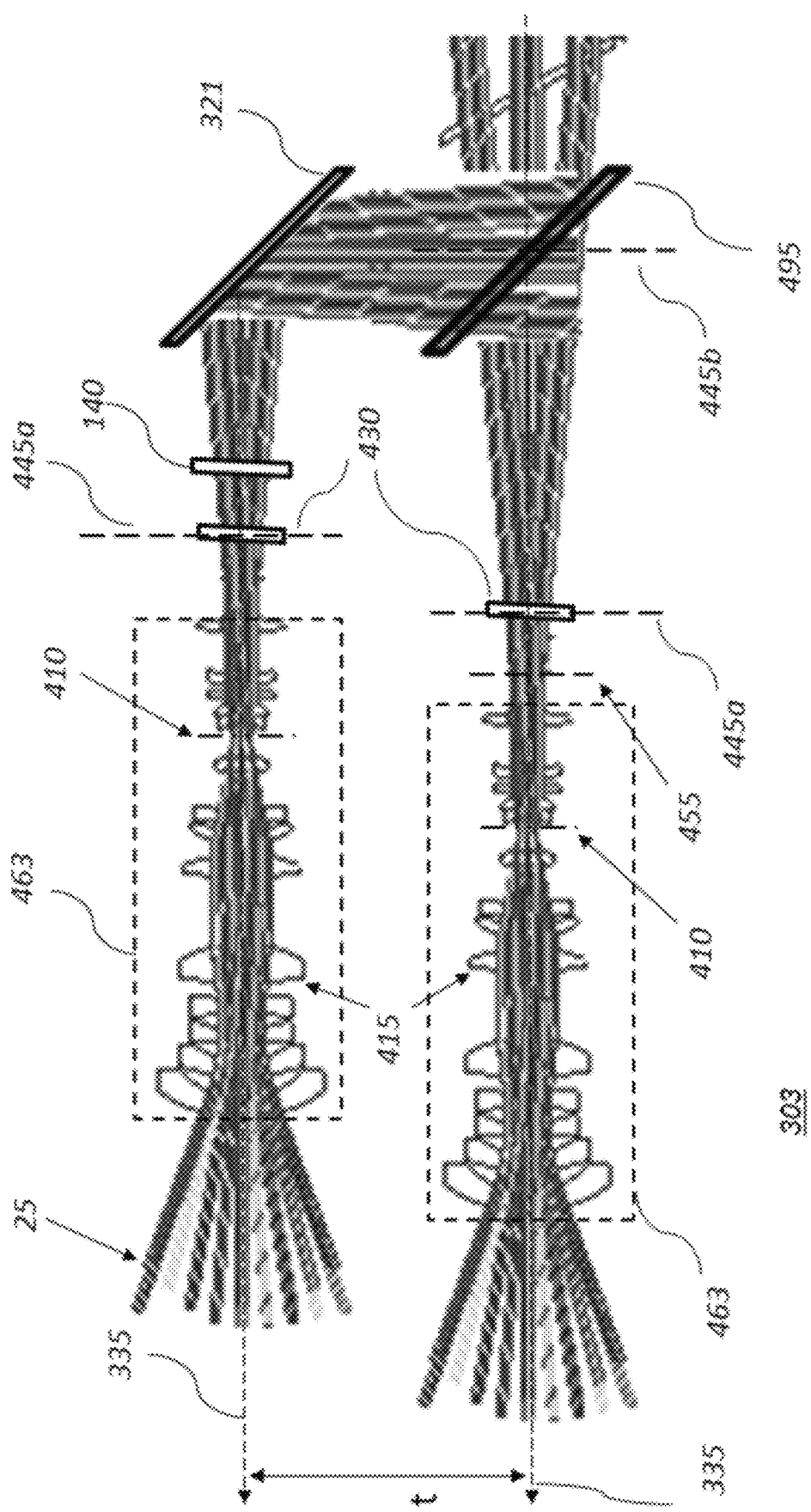
FIG. 11 depicts an alternate projection system to that of FIG. 10 in which rejected image light is directed to a second projection lens according to one example of the present disclosure.

FIG. 11 depicts a variant of the projector 303 of FIG. 10 in which the polarizing element is a PBS 495 that acts as a pre-polarizer and a beam splitter, and the beam dump 485 is replaced with second optical path having a mirror 321, a quarter-wave retarder 140 oriented to provide a half wave rotation, a second stereo polarization modulator 430, and a portion of second imaging optics represented by a second projection lens 463. In this case, imaging optics 400 includes the relay optics (not shown) and the two projection lenses 463. The two stereo polarization modulators 430, which together provide left eye image light and right eye image light, are positioned and tilted so as reduce their degradation to intra-frame contrast. In the projector of FIG. 11, the polarization conversion system represented by the two stereo polarization modulators 430 located at comparable internal positions 445a that are integrated into the projector 303 both opto-mechanically and by design, rather than being an add on "light doubler" after the projector 303. This approach can be optically superior, as the post projector light doublers struggle to receive and optically accommodate the highly divergent image light 25 that is emitted by the projector.

A projection system with a stereo polarization modulator located in front of a projector can result in a portion of the image light that back-reflects or scatters from the modulator and cause dramatic intra-frame contrast degradation. A projector 303 having a configuration as in FIG. 10, however, can be set up such that relay optics provide an intermediate image plane 455 about 10 mm prior to a projection lens 463, and the axial distance between the last relay optical element (not shown) and the first projection lens element can be greater than 200 mm. In this example, the PBS 495 can be offset from the projection lens 463 by a distance greater than 200 mm. When the stereo polarization modulator 430 is installed in an external position 440 in front of the projector system, with the scatter and back reflections, ANSI contrast can fall to approximately 150:1. By comparison, the measured ANSI contrast of the optical system without a stereo polarization modulator 430 in the optical path, can exceed 800:1.

Figure 12:
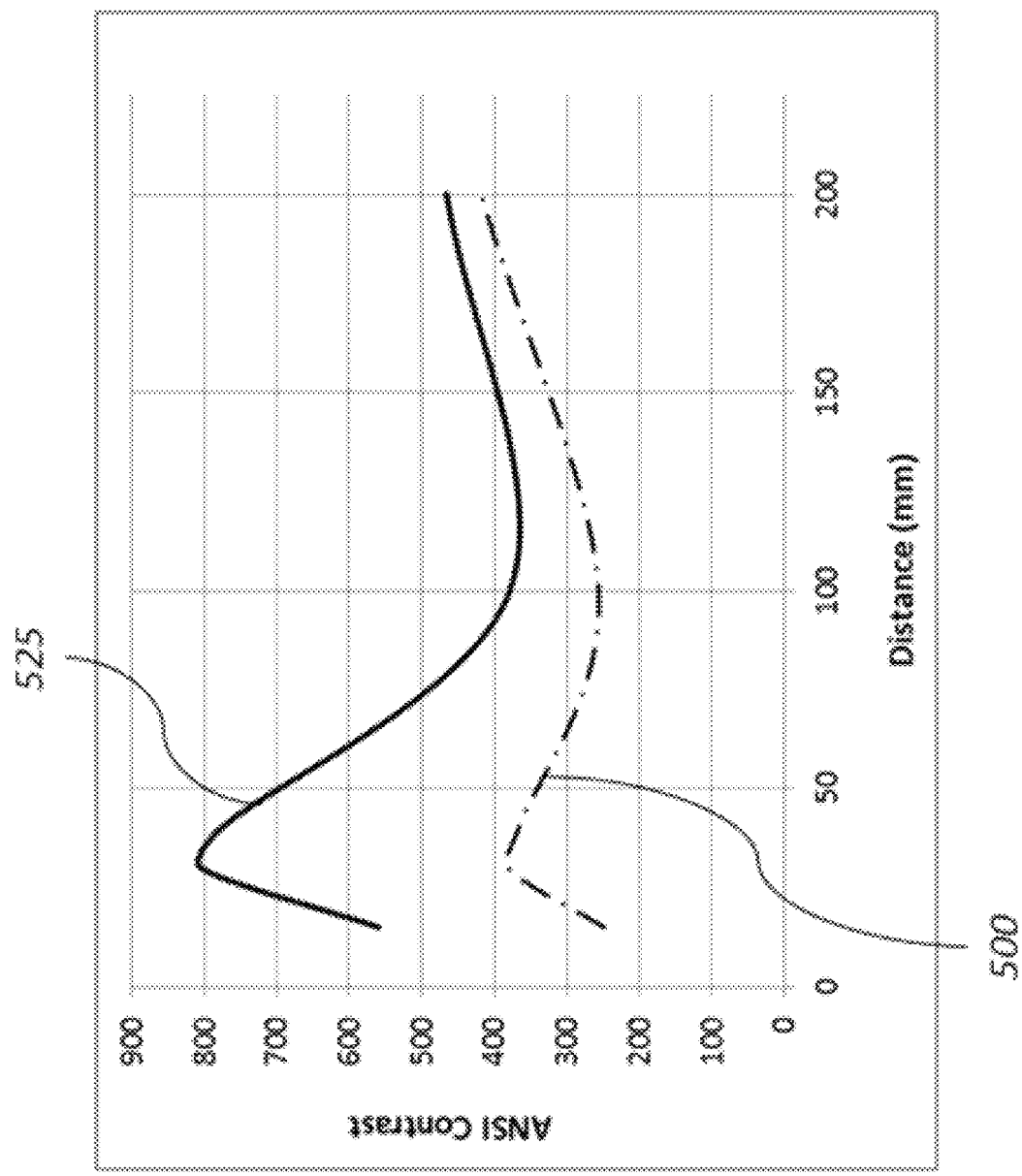
FIG. 12 depicts measured data of ANSI contrast for a stereo polarization modulator located at varying distances from a projection lens according to one example of the present disclosure.

An LC type stereo polarization modulator 430 without an integrated pre-polarizer can be used at various internal positions 445 in the optical path. The pre-polarizer function can be provided by the PBS 495, which can be offset from the stereo polarization modulator 430 by a distance of 10-200 mm, depending on the given position of the modulator. The results of some examples of this configuration are shown in FIG. 12, which graphs measured ANSI CR versus modulator position away from the first projection lens element, and towards the last relay optics element. FIG. 12 shows higher ANSI CR for a test stereo polarization modulator located in these internal positions 445 compared to the external positions 440. In particular, the curve 500, of ANSI CR without rotation, for which the stereo polarization modulator is not tilted, but is aligned normal to the local optical axis, provides a minimum ANSI CR >250:1, and nearly 400:1 at a location about 30 mm from the projection lens 463. Whereas, curve 525 of ANSI CR with rotation versus position, shows the performance with the stereo polarization modulator 430 at a fixed tilt away from normal to the local optical axis and different positions. This curve demonstrates a minimum ANSI CR >350:1, and a maximum ANSI contrast that peaks at over 800:1 with the stereo polarization modulator 430 at an optical path location about 30 mm from the projection lens. Projection systems can support significantly higher measurable ANSI CR values than those depicted in FIG. 12. For example, curve 525 of improved ANSI CR was obtained in a projection test system that was assembled without a field stop. These graphs indicate that the stereo modulator position can be optimized for ANSI contrast, with improvements coming from optimizing position, and additional improvements coming from optimizing both position and tilt. At the internal distance along the local optic axis or optical path at which peak intra-frame CR occurs, a significant amount of scattered light from the stereo polarization modulator 430 can miss the lens, or be blocked by light absorbing or trapping surfaces of the lens barrel, including the light blocking surface 275 of the physical aperture stop 265, and the blackened lens seats and walls of the lens barrel (see also FIG. 16). In general, the projectors with relay optics (e.g., FIGS. 8, 9, 10, and 11) can provide more optical path length for stray light created within the stereo polarization modulator to propagate away from the remaining image light and encounter baffles or light traps, or the light blocking surface 275 of the aperture stop 265, than does a projection system with direct imaging (e.g., FIG. 6).

These curves indicate that a peak ANSI CR can occur when a stereo polarization modulator 430 is positioned at an internal position 445 in the optical path at or near the intermediate image plane 455, which in this example is located about 10 mm from the projection lens 463 (the lens has a short working distance (~10-15 mm)). In particular, the stereo polarization modulator 430 can be located at a distance outside the depth of focus of the projection lens or imaging optics, so that neither the modulator nor any structure or debris thereon, is in focus with the projected image. Likewise, the further the modulator is from the intermediate image plane, the less likely any structure or debris is to cause visible shadows in the projected image. As an example, for a projection lens having a 100-150 micron-wide depth of focus, a 10-30 mm offset distance between the intermediate image plane 455 and the stereo polarization modulator 430 can be sufficiently in the far field to account for both depth of focus and shadow artifacts. However, for a stereo polarization modulator 430 fabricated with fewer scattering elements, whether from cell gap spacers, scratches, digs, dust, or other inhomogeneities, which scatters less light, the stray light generation can be reduced, and the optimal position for locating the modulator device for ANSI contrast can be located in a wider range of internal positions 445 (e.g., 5-35 mm prior to the intermediate image), and so maintain, or nearly maintain, the projector's original high ANSI contrast. Likewise, other stereo polarization modulators 430 can have different light scattering characteristics that shift the peak ANSI contrast closer to the intermediate image, or to an internal position 445 between the lens barrel and an intermediate image plane 455. Projection optics can be designed to have a long enough working distance (e.g., 25-50 mm), or clearance to the lens barrel, to allow that positioning. However, even if peak ANSI contrast occurs with the modulator located between the lens and intermediate image plane, much improved ANSI contrast can also be obtained with the modulator located at a less mechanically constrained internal position 445 prior to the intermediate image.

Figure 13:
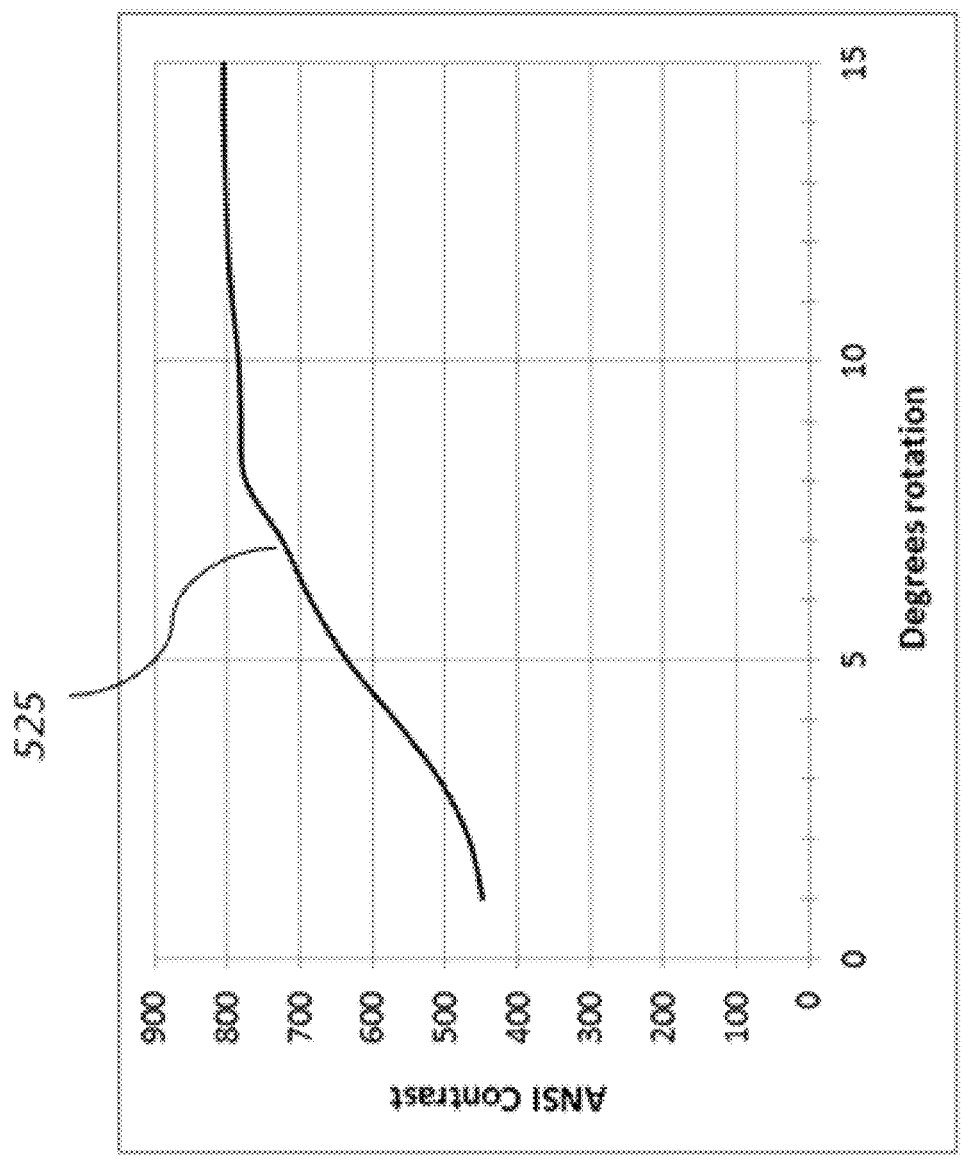
FIG. 13 depicts measured data of ANSI contrast for a stereo polarization modulator being tilted while located at a fixed distance from a projection lens according to one example of the present disclosure.

By comparison, FIG. 13 shows a measured curve 525 of ANSI CR with respect to rotation for which a stereo polarization modulator 430 is at a fixed position about 30 mm from the projection lens, and tilted away from normal to the local optical axis. For this test device, peak ANSI contrast of ~800:1 first occurs with approximately 9-13 degrees of tilt (θ) of the stereo polarization modulator 430. This tilt can be kept at the minimally necessary values, as a tilted plate introduces astigmatism that degrades image quality, unless it is otherwise corrected. However, a stereo polarization modulator 430 that introduces less optical scattering can have less tilt to help reduce ANSI contrast degradation, although the astigmatism can be corrected with another compensating tilted plate.

Figure 14:
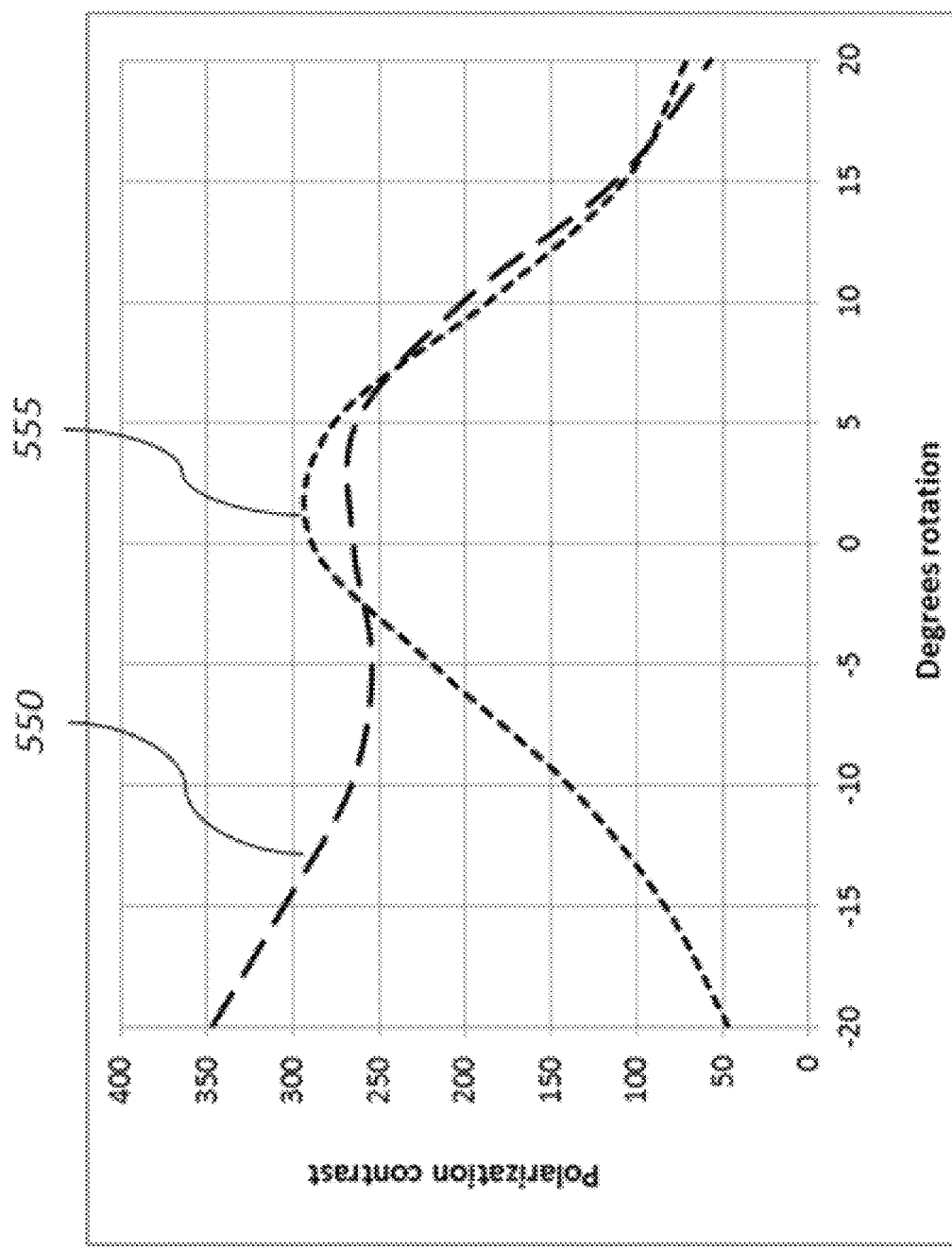
FIG. 14 depicts measured data of polarization contrast for a stereo polarization modulator versus tilt according to one example of the present disclosure.

Further care may be needed, however, as the polarization contrast of stereo polarization modulators 430 also has an angular dependence, particularly as some LC devices have an asymmetrical angular response. FIG. 14 depicts the measured polarization contrast for an LC stereo polarization modulator 430 versus tilt relative to the local optical axis, and while the horizontally rotated polarization contrast 555 has a symmetrical response that drops off with the angle, the vertically rotated polarization contrast curve 500 has an asymmetrical response for which polarization contrast improves with a particular direction of vertical tilt. This type of polarization contrast asymmetry typically occurs because the LC alignment layers within an LC-cell are deposited with a pre-tilt angle that then breaks the device symmetry, and pre-tilt can be useful for obtaining a domain-free LC molecular orientation when the device is operating under an applied electric field. For the particular test device, FIG. 14 indicates a preference for a vertical tilt (θ) for maintaining a high polarization contrast. If device tilt is limited due to astigmatism or mechanical or other constraints, a more modest tilt (e.g., about 3-7°) can still provide some polarization contrast and intra-frame contrast improvements (as shown in FIG. 13). Thus, for example, in using this stereo polarization modulator 430 located in an internal position 445 in a projector 300, a tilt (e.g., 5-6°) to improve ANSI CR can also account for, or balance, for both astigmatism and polarization contrast also caused by tilting the device.

Taken together, the measured contrast data of FIGS. 12, 13, and 14 indicate that intra-frame contrast of a projector operable with a stereo polarization modulator can be improved by positioning the modulator at an internal position, rather than at an external position, while further tilting the modulator device to both further improve intra-frame contrast and substantially maintain polarization contrast. For example, in the projectors of FIGS. 6 and 8-11 a stereo polarization modulator is located and tilted at an internal position 445. As a result, a significant portion of stray image light that was diffused, scattered, back-reflected, or otherwise redirected by the stereo polarization modulator can be blocked, thereby preventing that light from reaching the display surface and reducing intra-frame contrast. These can improve the intra-frame contrast for projected scenes, although the magnitude can be dependent on both the average scene brightness and the structure of the image content (e.g., size and position of highlights). As an option, a projector can be further equipped with a variable aperture (e.g., an adjustable iris) to help control intra-frame contrast on a scene dependent basis. This variable aperture can be located at an aperture stop 410 or other internal position in the projector.

Figure 16:
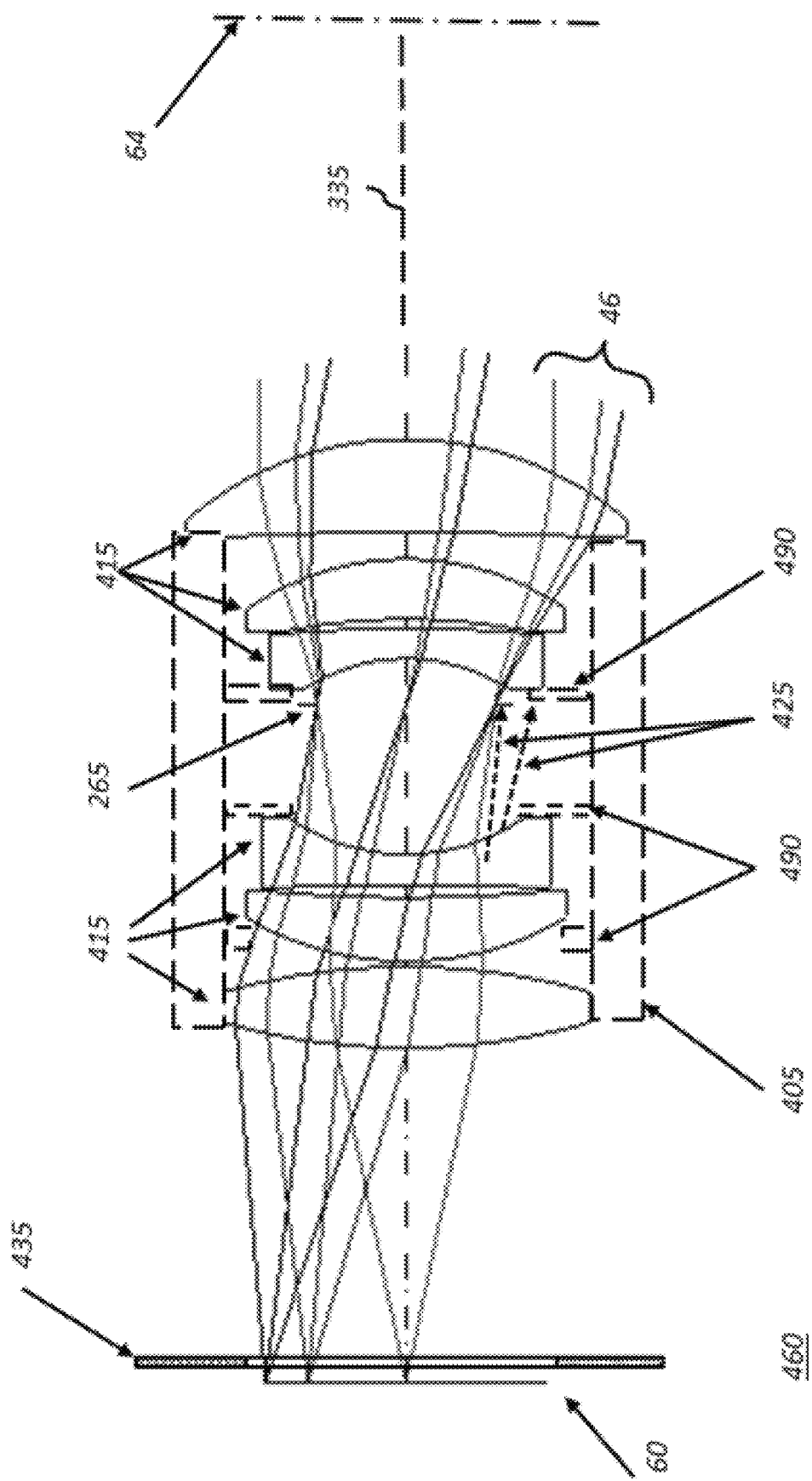
FIG. 16 depicts an imaging lens having a lens barrel or housing that includes baffles to block stray light according to one example of the present disclosure.

The design of the aperture stop and other baffles in the optical (lens) housing or barrels can trap or block stray light and help intra-frame contrast. For example, FIG. 16 depicts an imaging lens assembly or projection lens 460 that directs image light beams 46 to image an object plane 60 generally along an optical axis 335 to a distant image plane 64. Object plane 60 can also be an intermediate image plane. The lens assembly, which can also be a relay lens, further includes a housing or lens barrel 405 that not only provides physical supports for the lens elements 415 but also baffles 490. Stray light 425 can hit both baffles 490 and aperture stop 265 both of which can be textured, blackened, and positioned to block or trap and absorb that stray light. The internal surface of the lens barrel 405 and the outer edges of the lens elements 415 can also be advantageously blackened. A field stop 435, and other baffles with light absorbing features, can also be positioned external to the lens barrel 405, and used to assist with stray light blocking. The improvements in ANSI or intra-frame contrast may also benefit the image resolution or MTF provided to the display surface, as the light levels in the black areas between the resolvable details are likewise reduced.

Furthermore, a stereo polarization modulator 430 designed for use at an internal position 445 within a projector can be optimized for superior polarization performance (e.g., higher polarization contrast), as it operates in modestly divergent light (e.g., F/3.5 or ±8.2° cone). Likewise, if the optical design provides telecentric optics that provide telecentric space (e.g., angular fields of view are a parallel to within a ±0.5° tolerance) near the intermediate image, the optical angles seen by the device can be further reduced to aide angular polarization contrast performance optimization. This increased level of performance and reduced divergence from using telecentric optics can help the polarization modulator device be more tolerant of tilt (θ). Whereas, a stereo polarization modulator 430 located at an external position 440 is performance-limited by being in highly divergent light (e.g., ±45°), severely limiting any device tilt that could be applied to boost intra-frame contrast.

Intra-frame contrast improvements can also apply to the circular polarization filter 175 of FIG. 3, and equivalent devices, in addition or alternative to placement and construction of the stereo polarization modulator. This rotating circular filter wheel-type device can be similarly both located at internal positions 445 within a projector 300, and tilted at an angle at those positions, so that all or most stray light generated by this device is trapped or blocked by the aperture stop(s) 410 and other surfaces. In these devices, stray light can be generated from scattering due to film or substrate inhomogeneities, scratches, digs, or dust, film ripples, and film lamination defects or bubbles. However, as the circular polarization filter 175 includes both linear polarization filters and quarter-wave retarders, these materials can be assembled or upgraded to provide better optical quality. For example, the wave plates can include crystalline quartz, and the linear polarizer can be separated from the device and installed in a separate in system location. Likewise, plastic substrate materials can be replaced by glass, which is more isotropic and has better surface quality. Moreover, for a circular polarization filter 175 located at an internal position 445 instead of an external position to the projector, the scanned image area 180 is smaller, and thus this device can be both smaller and less expensive to fabricate and operate. Alternately, replacing the LC stereo polarization modulator 430 of FIG. 7 with a simpler device, such as an FLC switch, can help intra-frame contrast, as single LC cell devices can have fewer light scattering surfaces, including cell gap spacers.

However, as the retarders remain on the rotating circular polarization filter 175 and the polarization filter 175 is fixed at a prior internal position 445, two polarization components do not rotate together, and the outgoing image light 25 can be elliptically polarized instead of circularly polarized. If necessary, a segmented wire grid PBS wheel can be substituted for PBS 495 at position 445*b* (FIGS. 10-11) and rotate synchronously with the polarization filter stereo modulator wheel. As the wheel rotates, the dwell time for an inner part of the image area 180 relative to the center of rotation of the wheel, to the outer part of the image area 180, can be different. However, illumination non-uniformity to the spatial light modulators 170 can be structured to compensate.

In another example, the rotating circular polarization filter 175 can also be used with the projector of FIG. 11 having two projection paths with two projection lenses 463. However, if the optical path lengths are managed, as well as the offset distance "t" between the two projection paths, then the comparable internal positions 445*a* can lie in a common plane (e.g., coplanar) that is also perpendicular to both local optical axis 335. In that case, a rotating circular polarization filter 175 (not shown) can be positioned so that it provides stereo polarization modulation to both optical paths, simultaneously modulating each on as right (R) or left (L).

As described previously, operating a projector in combination with a stereo polarization modulator 430, while providing or maintaining the high (e.g., ≥800:1) ANSI contrast of the projector, can motivate locating the stereo polarization modulator 430 at internal positions 445 within the projector. However, when modulating image light 25 for stereo perception using polarization, the perceived image quality can be dependent on the polarization quality of that image light. In the case that the light source is a xenon lamp, the emitted light is innately fully and randomly non-polarized. Prior to the stereo polarization modulator 430, a linear polarizer or PBS 495 can act as a pre-polarizer on the incoming image light. Thereafter, any spatial or angular polarization signature from downstream optics such as the spatial light modulators 350 and the dichroic combiner 345 can be washed out because light from xenon lamps lacks any angular or spatial polarization bias.

However, once the polarized image light is past the stereo polarization modulator 430, downstream optics can degrade the polarization state purity, and degrade stereo image quality. For example, in the projector of FIG. 6, with the stereo polarization modulator 430 located at an internal position 445, the projection lens 460 can degrade the polarization quality of the image light depending on both the design of the lens and the thermal load indicated by the screen size (or total screen lumens) and the image content. If necessary, polarization maintenance for lenses can be largely accomplished by careful lens design, where different optical glasses are strategically selected and placed to reduce thermal stress birefringence.

Additionally, if a projector uses laser light sources, emitted laser light that is typically intrinsically polarized can cause complications if the polarization quality is not generally maintained. Alternately, for example, laser-based illumination assemblies 310 can be further equipped with depolarizers 340, as shown in FIGS. 6, 8, and 9, such as those of the crystal based Lyot or Cornu type. However, even with these devices, the laser light can be imperfectly depolarized, and greater care can be used to ensure that the dichroic combiner 345 is also polarization neutral. For example, image light 25 passing through the projection optics can be angularly and spatially depolarized, such that a ratio of "s" polarized to "p" polarized light, which is ideally 1:1, with a tolerance of ≤0.1%, e.g, 1.001:1, for the field positions.

In one example, providing stereo image projection with improved intra-frame contrast can include a stereo polarization modulator positioned in the optical path prior to an aperture stop of imaging optics. The imaging optics can include a refractive projection lens (FIG. 6), a refractive relay lens and refractive projection lens combination (FIG. 8), or a reflective relay lens and refractive projection lens combination (FIG. 9). In addition, the relay can be catadioptric, and include both refractive and reflective optical elements with optical power. Additionally, the projection optics can also be catadioptric or catoptric (using all reflective elements), for example using telescopic optics configurations, instead of being a more typical projection lens including all refractive lens elements. Most classical telescopic forms, such as Cassegrain or Ritchey-Chretien designs, are used for astronomy and have a narrow field of view and an infinite conjugate. However, there are telescopic, catoptric, imaging optics designs that provide finite (though distant) conjugate imaging and large fields of view. For example, off-axis telescopic design forms, such as the "reflective triplet," which uses three primary mirror elements and lacks an intermediate image, or a "three-mirror anistigmat," which generally includes an intermediate image, can be used for image projection applications. Additionally, the mirrors typically use some combination of elliptical, hyperbolic, parabolic, or free-form surface profiles.

Alternately, for the circumstance that a projector having high intra-frame contrast can be equipped with an externally mounted stereo polarization modulator. Further efforts can be made to reduce or capture redirected light (e.g., scattered or reflected light) from any optical element between the projection lens and the port window such as the stereo polarization modulator, from a projection booth port window, or from a projection lens element to improve image quality. In particular, various features to deal with stray light can be added, to the supporting assembly of an optical element, to the front of the projector, to the port window, the space between the projector and the stereo polarization modulator, to the space between the stereo polarization modulator and the port window or to the space between the projector and the port window, Features to deal with stray light can also be added to within the optical element such as reducing optical scatter from cell gap spacers in a stereo polarization modulator. Other optical elements can be light encoding elements such as polarizers, analyzer or other light encoding devices. Surfaces can reflect light based on the incident angle of light received by the surface. A portion of light can be directed to a surface that is able to absorb the received light and heat can be dissipated by the surface, or it can be actively cooled using a fan. An optical surface in the light path that has contaminants (e.g. dust or other airborne pollutant) may scatter light received by the surface. The more contaminants on the optical surface, the more light may be redirected by being scattered by contaminants on the optical surface. A port window, a projection lens, or a stereo polarization modulator can redirect more light over time because of contaminant accumulation on any optical surface of these devices that is exposed to projection booth or auditorium air.

Figure 15:
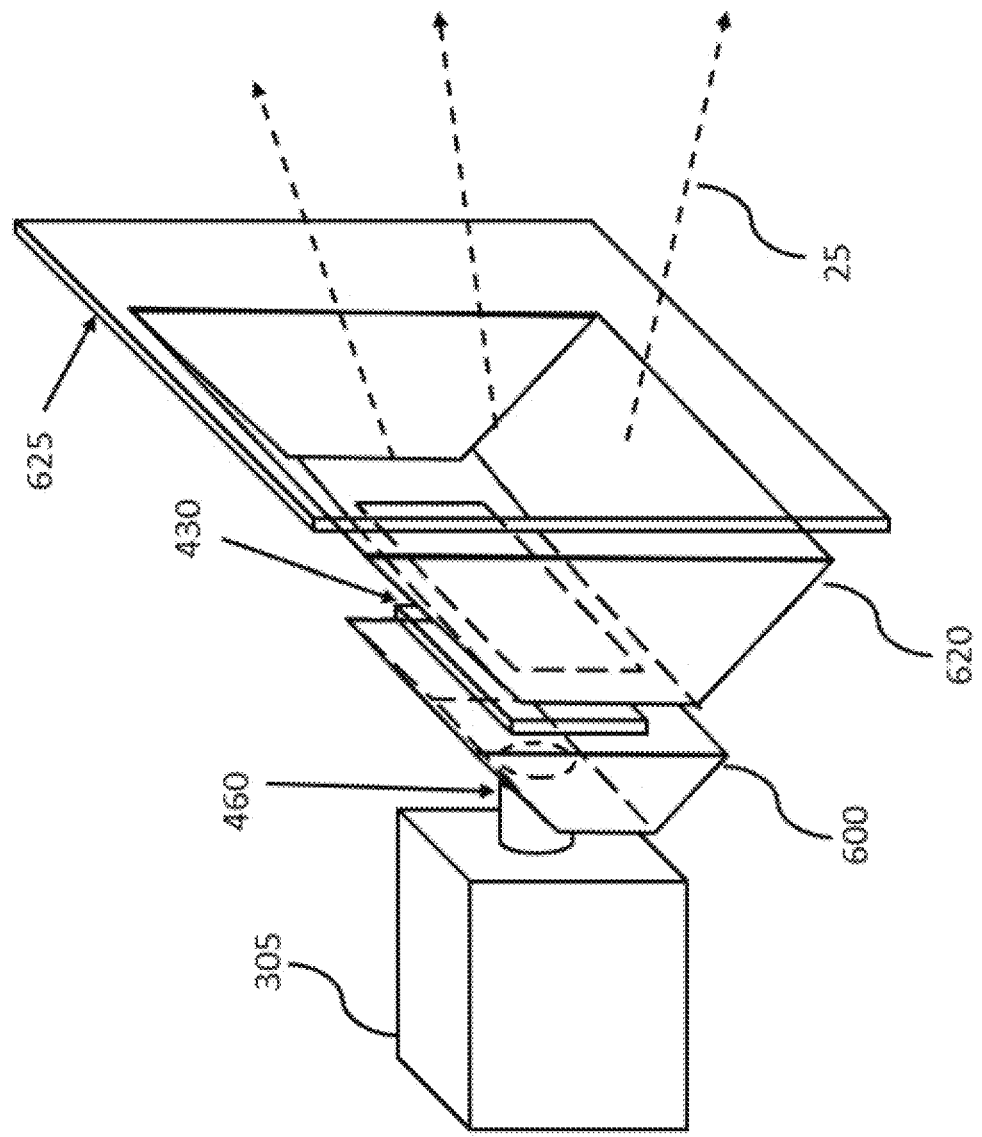
FIG. 15 depicts a projection system with an enclosure assembly positioned between the stereo polarization modulator and the projector according to one example of the present disclosure.

FIG. 15 depicts an exploded view of two enclosures 600, 620 between a projector 305 and a port window 625 with a projector stereo polarization modulator 430. The first enclosure 600 is positioned between a projection lens 460 and an optical element or assembly such as an external stereo polarization modulator 430. The second enclosure 620 is positioned between the stereo polarization modulator 430 and the port window 625. The dashed lines (other than lines indicating light) reflect interior components that help illustrate some interior surfaces of the enclosure. Image light 25 can emerge from the projection lens 460 and is received by the port window 625; however, stray light can be generated from scattering, reflections, or diffraction of light from optical surfaces on the projection lens 460, the port window 625 and the optical element to cause light to be redirected in undesirable (e.g., unintended or secondary) light paths between the projection lens and the port window. Light that has been redirected can encounter interior light absorbing surfaces of the enclosure 600, 620, so a portion of the undesirable redirected light can be absorbed and is not able to contribute to reducing intra-frame image contrast.

The enclosure 600 can be added and constructed to encompass or surround the space or volume with imaged light between the projector 305 or the projection lens 460 and the stereo polarization modulator 430, with the interior surfaces of the enclosure between the stereo polarization modulator 430 and the projection lens 460 having light absorbing materials or features. Preferably, the materials have a matte black finish, are able to handle intense light levels, and neither significantly outgas nor readily shed material that can cause contamination. Possible coatings include Aeroglaze® Z306 from Lord Corp. (Cary, NC) and Avian Black from Avian Technologies (New London, NH). Light absorption and intra-frame contrast can also be improved if the light absorbing surfaces or baffles have a textured surface, such as surfaces that have been sand blasted or that have a surface relief, or a fin, a cone, or pyramid-like features. The interior walls of the enclosure 600 can also be constructed such that these high light absorbing surfaces are positioned outside of, or offset from, the direct light path between the projection lens and the active portion of the stereo polarization modulator. In areas where stray light on the enclosure is of an intensity suitable for using other light absorbing materials, such as velvet-like flocking materials or flocking paper provided by Edmund Optics (Barrington, NJ), can be effective at absorbing stray light, including if they minimally shed fibers or other contaminants. Flocked textured finishes or flocked materials can be created by a flocking process so that black fibers are deposited on a surface to provide enhanced light absorption. The external optical surfaces of the stereo polarization modulator 430 can also have anti-reflection coatings to help reduce reflections and the influence of scattered light.

The enclosure 600 can also be designed such that the space enclosed between the front of the projection lens 460, or the front of the projector 305, and the stereo polarization modulator 430, remains relatively free of contaminants that can otherwise end up on the optical surfaces of the stereo polarization modulator or the projection lens. In situations where 2D projection does not use the stereo polarization modulator in front of the projection lens 460, a mechanism (not shown) can cause the stereo polarization modulator 430 to transition out of the direct light path, while keeping the enclosure 600 relatively closed or sealed to keep contaminants out.

As discussed previously, stereo polarization modulator 430 can include a wire-grid pre-polarizer, which can back-reflect light towards the projector that can cause a significant light scattering from the front surface of the projector contributing to a reduction in intra-frame contrast. Both the stereo polarization modulator 430 and the associated pre-polarizer can be located within the projector, in the optical path prior to the projection lens 460. Alternately, the pre-polarizer can be located prior to the projection lens 460, while the remainder of the stereo polarization modulator 430 is located after the projection lens 460. As an additional option, the stereo polarization modulator 430 can have an accompanying polarizer that absorbs rather than reflects light like a wire grid polarizer, and an additional cooling may be used for the stereo polarization modulator.

Additional cooling for a stereo polarization modulator can be provided by a fan (not shown) mounted within the enclosure 600 to cool the surface of the stereo polarization modulator 430 surface that is inside of the enclosure 600. Air filtering can also be employed to further reduce risk of dust contamination of the interior surface of the enclosure 600. Another approach is to use an air knife positioned to blow dust free air over the surface to be cooled in which the air to the air knife is filtered. Another possible advantage of using an external source of air to blow over the surface to be cooled within the enclosure is that an internal positive pressure can be created to cause a pressure gradient that ensures contaminants external to the enclosure remain external of the enclosed space. If cooling is not used, positive air pressure can still be used to keep contaminants from migrating into the enclosed space.

FIG. 15 further shows a second enclosure 620 that can be provided between the stereo polarization modulator 430 and the port window 625. The port window 625 is the window of glass that separates the projection booth space from the theatre space where patrons are seated to view projected images. Enclosing the space between the stereo polarization modulator 430 and the port window 625 can make it possible to create another volume of air that is substantially free of contaminants, thus reducing the contaminants accumulation over time on the surface of the stereo polarization modulator 430 that faces the port window 625. The second enclosure 620 can allow contaminant-free cooling of the stereo polarization modulator surface that faces the port window 625. Likewise, it can also be possible to cool the surface of the stereo polarization modulator 430 that faces the port window 625 with filtered air that provides positive pressure further reducing the risk of surface contamination. For projection systems in which the stereo polarization modulator 430 is not used, it can be temporarily removed from the projected image light path, while both enclosure 600 and second enclosure 620 are kept in place (along with appropriate seals or gaskets), to help keep this local environment clean.

Figure 17:
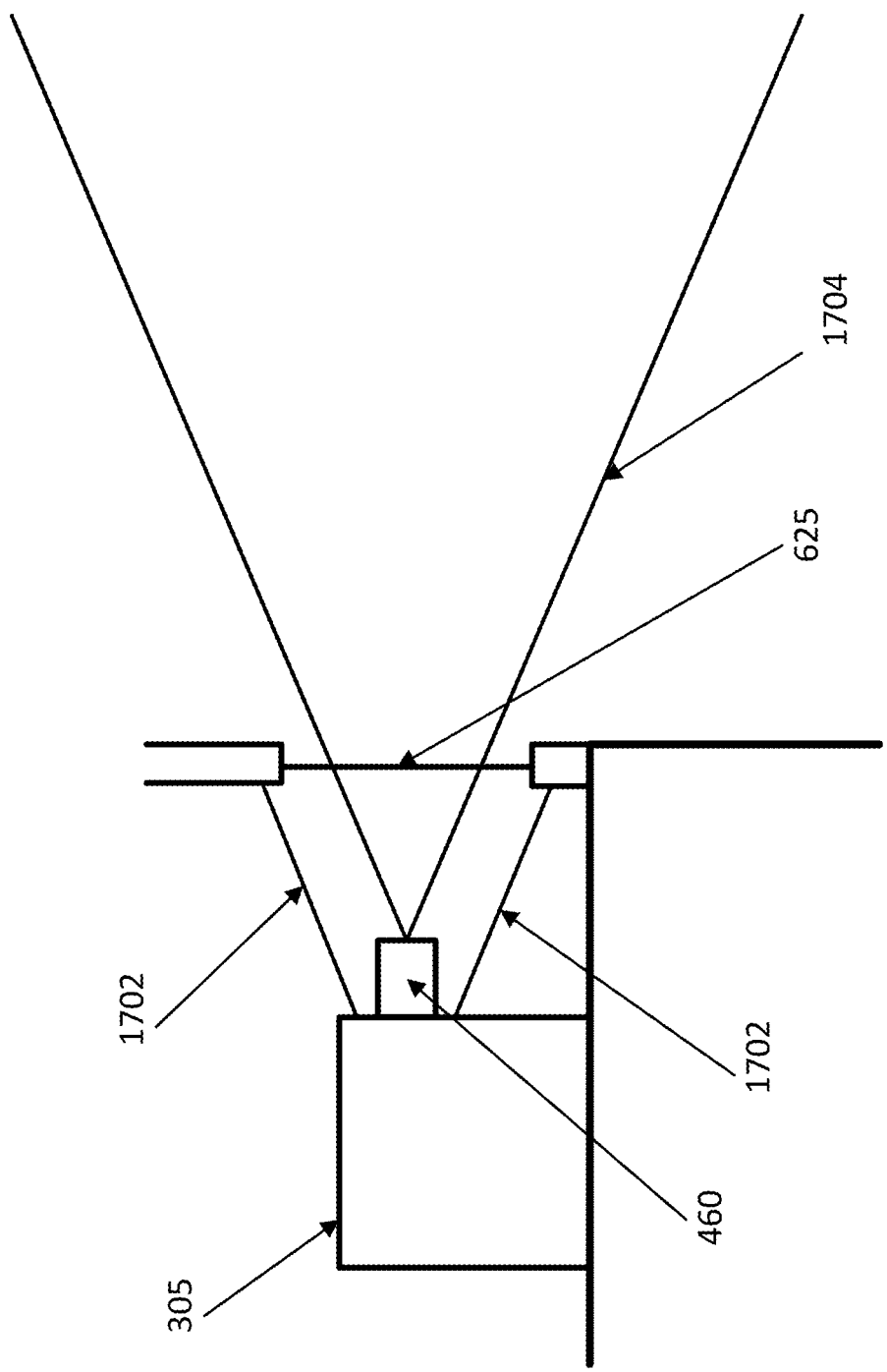
FIG. 17 depicts a schematic block diagram of an example of a projection system with an enclosure according to one example of the present disclosure.

Alternately, as shown in FIG. 17, an enclosure 1702 can be used between the projection lens 460 or the front of the projector 305 and the port window 625. The single enclosure 1702 may extend from the front of the projector 305, and from generally adjacent to the projection lens 460, to the port window 625 area to shield the enclosed air volume from contamination. Light 1704 projected from the projection lens 460 is directed towards a screen (not shown) in the auditorium side of the port window 625. The enclosure 1702 can also allow a stereo polarization modulator to be positioned within the enclosed space such that it is in position, as needed, and can be moved out of the light path when not used. For 2D projection systems that do not use a stereo polarization modulator, the first enclosure 600 and the second enclosure 620 from FIG. 15 can be one separate, add-on enclosure 1702 between the projector 305 of FIG. 15 or projection lens 460 and the port window 625. The enclosure 1702 can have interior surfaces with light absorbing features and create a contaminant-free environment by enclosing components and by having a positive air pressure within the enclosure 1702. For 3D projection with an internal polarization switch, the stereo polarization modulator 430 and polarizers can remain located within the projector, prior to both the projection lens 460 and the enclosure 1702, in which case the enclosure 1702 can reduce contamination risks on optical surfaces between the projector 305 and the port window 625.

The walls of an enclosure, whether it is a single enclosure between the projector and the port window or two separate enclosures, can be constructed of soft or hard materials. The enclosure that mates up with the port window can be a telescoping baffle to allow for different distances between the projector and the port window. Soft materials that can be used for the baffle can be cloths or synthetic materials such a Tyvek®. These soft materials can be black in color and can restrict contaminates outside of the enclosure from passing through the walls of the enclosure to the inside space. The enclosure can have a frame structure to support soft materials forming flexible enclosure walls. The enclosure can be mounted to the port window assembly, the port window frame, or to the front of the projector. Mounting the soft material of the enclosure to the port window or to the projector can be performed using Velcro® or similar coupling mechanisms that provide quick connect and quick disconnect. If two enclosure assemblies are used, one enclosure can be mounted on the projector the other onto the port window assembly. For example, enclosure 600 from FIG. 15 can be mounted to the front of the projector 305 and the enclosure 620 can be mounted at the port window 625. The enclosure can also be adjustable to position the projector 305 at different distances from the port window 625.

To maintain high intra-frame contrast, the port window 625 can be kept clean. Various approaches can be used to keep the port window 625 clean, or to clean it as needed. As previously, filtered air can also be directed at the port window surfaces to help keep them clean. As another example, the surfaces of the port window 625 can have a self-cleaning or anti-static surface treatment or coating, such as Pilkington Activ™ (Lankashire, UK) or Clevios™ from Heraeus (Hanau, DE). The surface may also have a conductive surface coating to reduce the ability of the charged contaminant particles from sticking to the surface, similar to mechanisms used to reduce motion picture film from attracting dust and other contaminants. As yet another approach to keep contaminants to a minimum on a surface such as a port window, a particle transfer roller (PTR) can be rolled over the surface with contaminants to pick up the contaminant particles. A PTR, such as from Eastman Kodak (Rochester, NY), has an outer surface that includes a slightly sticky urethane material that can remove dust from a surface when the roller passes over the surface. The PTR can be washed using an ultrasonic cleaner with a solvent, dried, and reused. In some examples, a PTR can be automatically rolled over the port window 625 in a theatre to intermittently clean the window surfaces.

Figure 18:
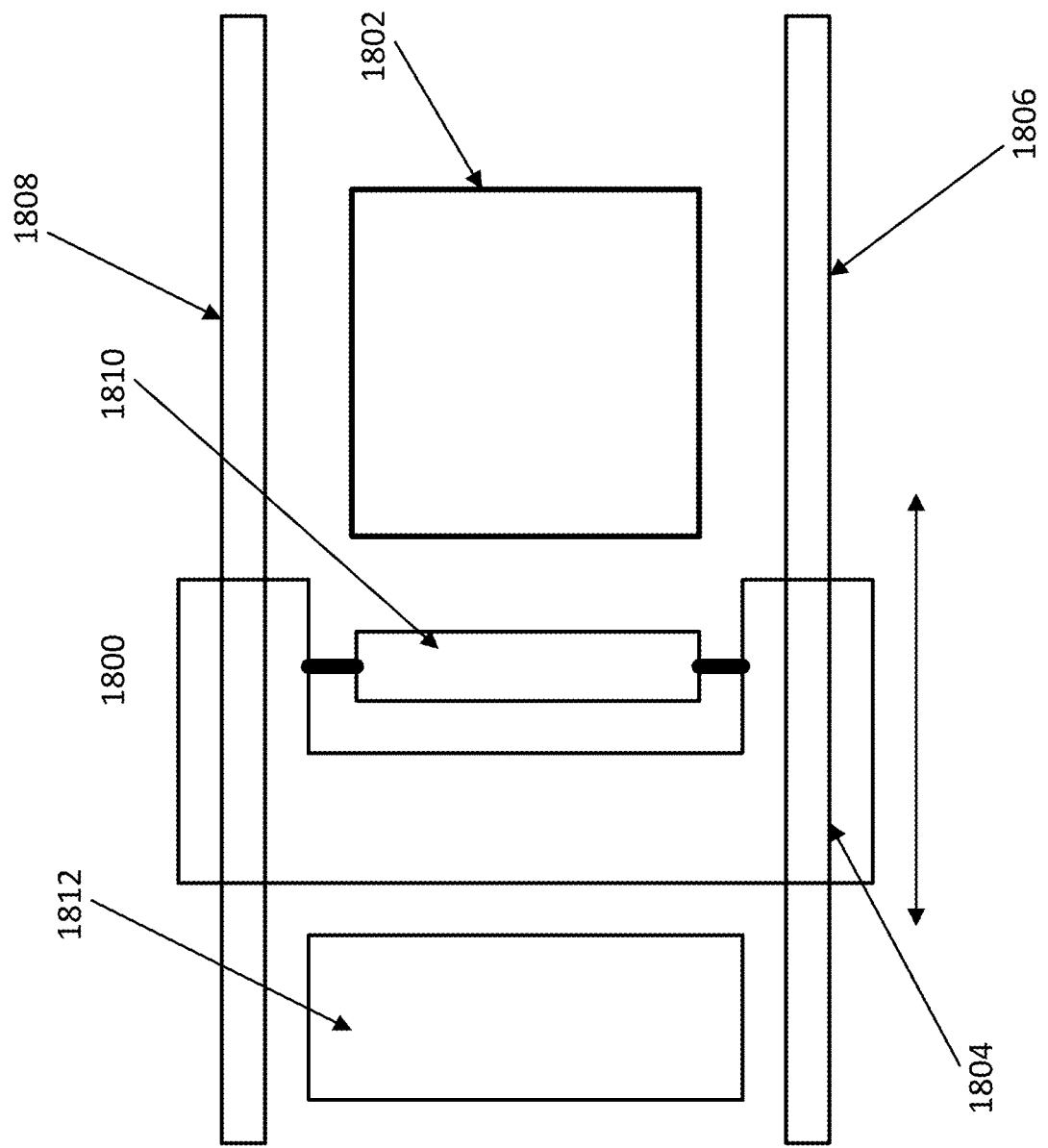
FIG. 18 depicts a schematic of a cleaning system for a port window of a projection system according to one example of the present disclosure.

For example, FIG. 18 shows a view of a port window 1802 with a window cleaning system 1800 when the viewer is positioned directly in front of the port window 1802 on the auditorium side. The projection booth port window 1802 has a carriage 1804 mounted on tracks 1806, 1808 such that the carriage 1804 can be moved over the surface of the port window 1802 to clean it. The carriage 1804 can have a PTR 1810 such that when the carriage 1804 transverses or transitions across the port window 1802 the PTR 1810, as it contacts the window surface and rolls over the surface, can pick up surface contaminants. The carriage 1804 can include a motor and control system such that the carriage motion can be controlled remotely. The carriage 1804 can also or alternatively include nozzles positioned on the carriage 1804 that can direct pressured, contaminant-free air at the port window surface to blow contaminants off the port window surface as the carriage 1804 transverses the port window 1802. Next to the port window 1802, where the carriage 1804 can be positioned, can be an access door 1812 in the wall between the projection booth and the auditorium to allow access from the projection booth to the carriage PTR 1810 that is on the auditorium side. For example, the PTR 1810 can be removed to be cleaned and then reinserted or other maintenance work can be performed on the carriage 1804.

As disclosed above there are a number of configurations that address contaminants on the port window. The ways disclosed can be combined in various ways or carried out in different configurations. For example, the port window 625 can be enclosed by an enclosure on the projection booth side of the port window 625 where the entire port window 625 is enclosed or the portion of the port window 625 that the projected image passes through is enclosed. The screen side of the port window surface can be configured with a coating that is self-cleaning, conductive, or anti-static or configured with a window cleaning system or both. The cleaning system can be a PTR mechanism that can transition the port window 625 to remove contaminant particles. Alternately, both the booth side and the screen side of the port window 625 can be configured with surfaces of the port window 625 treated with conductive or antistatic coating or configured with a window cleaning system or both. In another example, the port window 625 and the stereo polarization modulator 430 can be the same.

Various aspects and features of the described approaches for improving intra-frame contrast can be combined. For example, a projector having an internally mounted stereo polarization modulator 430 (e.g., per FIGS. 6, 8, 9, 10, and 11), that is further positioned and tilted to improve intra-frame contrast, can be used in combination with an enclosure 600 that extends from the projector to the port window 625, where the enclosure both helps contain stray light and reduces contamination onto the projection lens or port window surfaces. Other techniques, such as equipping the port window surfaces to be anti-static and self-cleaning, can also be used in combination with the projectors.

Certain aspects and features of the present approaches for improving ANSI contrast while providing polarization switching can be provided in other optical imaging systems or for other purposes than cinematic image projection. For example, certain aspects may be used for a polarization sensitive printing application, including certain types of photolithography. Likewise, optimally positioning and tilting the stereo polarization modulator within an imaging system can also be applied to other partially scattering optical components, including mild optical diffusers, diamond turned optics, or diffractive optics. In addition, although certain descriptions refer to ANSI contrast, various aspects can be applied with reference to other standards of contrast.

The foregoing description of the examples, including illustrated examples, of the subject matter has been presented only for the purpose of illustration and description and is not intended to be exhaustive or to limit the subject matter to the precise forms disclosed. Numerous modifications, adaptations, combinations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A projection system comprising:
   a projection lens of a projector configured to project an image light along an image light path, the projector positioned in a projection booth space;

a port window comprising a window of glass separating the projection booth space from a theatre auditorium space, the port window being configured to transmit projected image light along the image light path from the projection lens to the theatre auditorium space, the port window having a surface; and an enclosure positioned between the port window and the projector to surround the image light path between the port window and the projector, the enclosure being configured to absorb a portion of the image light that is scattered or reflected by the projection lens or by the surface of the port window, wherein the enclosure is adjustable for different distances between the port window and the projector.

2. The projection system of claim 1, further comprising an optical element between the projection lens and the port window, wherein the enclosure is configured to absorb a part of the image light that is scattered or reflected by the optical element.

3. The projection system of claim 2, wherein the optical element is a stereo polarization modulator.

4. The projection system of claim 2, where the enclosure has an interior surface configured to absorb the part of the projected image light that is scattered or reflected by the optical element.

5. The projection system of claim 1, further comprising a stereo polarization modulator positioned internally within the projection system.

6. The projection system of claim 1, wherein the enclosure has interior surfaces configured to absorb light, the interior surfaces having:
a matte black finish;
a flocked textured finish;
a finish created by a flocking process with black fibers; or
light baffle structures that include a fin, a cone, or a pyramid-like structure.

7. The projection system of claim 1, wherein the enclosure is configured to have an internal positive pressure with respect to pressure external to the enclosure.

8. The projection system of claim 1, wherein the port window has an outer surface having a coating for repelling contaminants.

9. The projection system of claim 1, further comprising:
a particle transfer roller for contacting the surface of the port window to remove contaminants from the surface; or
a nozzle positioned to direct air over the surface to remove contaminants from the surface.

10. The projection system of claim 9, wherein the projection system comprises the particle transfer roller, wherein the particle transfer roller is configured to transition over the window surface to remove the contaminants.

11. A method of reducing or capturing stray light in a projector by a projection system, the method comprising:

projecting, by a projection lens of the projector, an image light along an image light path toward a port window, a portion of the image light being scattered or reflected by the projection lens away from the image light path, the projector being positioned in a projection booth space;

transmitting, by the port window that comprises a window of glass separating the projection booth space from a theatre auditorium space, projected image light along the image light path from the projection lens to the theatre auditorium space, another portion of the image light being scattered or reflected by a surface of the port window away from the image light path;

absorbing, by an enclosure positioned between the port window and the projector to surround the image light path between the port window and the projector, the portion of the image light scattered or reflected by the projection lens and the other portion of the projected image light scattered or reflected by the surface of the port window; and adjusting a length of the enclosure between the port window and the projector.

12. The method of claim 11,
wherein part of the image light is scattered or reflected away from the image light path by an optical element between the projection lens and the port window.

13. The method of claim 12, wherein the optical element is a stereo polarization modulator positioned internally within the projection system.

14. The method of claim 12, further comprising:
absorbing, by an internal surface of the enclosure, the part of the image light that is scattered or reflected by the optical element.

15. The method of claim 11, further comprising:
creating an internal positive pressure in the enclosure with respect to pressure external to the enclosure.

16. The method of claim 11, further comprising:
repelling contaminants by a coating on an outer surface of the port window.

17. The method of claim 11, further comprising:
removing contaminants from the surface of the port window by a particle transfer roller transitioning over the surface and contacting the surface.

18. The projection system of claim 1, wherein the enclosure is coupled at a first end to the projector and is coupled at a second end to the port window, wherein the enclosure further comprises a surface defining an interior of the enclosure between the projector and the port window, and wherein the surface of the enclosure is configured to prevent contaminants external to the enclosure from entering the interior of the enclosure between the projector and the port window.

* * * * *